United States Patent
Nakagawa et al.

(10) Patent No.: US 7,813,066 B2
(45) Date of Patent: Oct. 12, 2010

(54) MAGNETIC RECORDING AND REPRODUCTION METHOD, RECORDING APPARATUS, REPRODUCTION APPARATUS AND MAGNETIC RECORDING MEDIUM

(75) Inventors: Toshiyuki Nakagawa, Kanagawa (JP); Hiroyuki Ino, Tokyo (JP); Tomoyuki Hiura, Kanagawa (JP); Tomohiro Ikegami, Kanagawa (JP); Masaaki Hara, Tokyo (JP); Norihito Mihota, Saitama (JP); Shinichi Fukuda, Kanagawa (JP); Yoshihiko Deoka, Tokyo (JP); Hidetoshi Honda, Miyagi (JP)

(73) Assignee: Sony Corporation, Tokyo (JP)

( * ) Notice: Subject to any disclaimer, the term of this patent is extended or adjusted under 35 U.S.C. 154(b) by 560 days.

(21) Appl. No.: 11/726,233

(22) Filed: Mar. 21, 2007

(65) Prior Publication Data
US 2007/0242376 A1    Oct. 18, 2007

(30) Foreign Application Priority Data
Mar. 29, 2006  (JP)  ............................ 2006-091822

(51) Int. Cl.
*G11B 5/09*  (2006.01)
(52) U.S. Cl. ............................ 360/39; 360/40; 360/48
(58) Field of Classification Search ........................ None
See application file for complete search history.

(56) References Cited

U.S. PATENT DOCUMENTS

| | | | |
|---|---|---|---|
| 4,509,083 A | 4/1985 | Nakano | |
| 6,714,375 B2 * | 3/2004 | Nishio et al. | 360/72.2 |
| 6,775,087 B2 * | 8/2004 | Chan et al. | 360/74.1 |
| 7,126,890 B2 | 10/2006 | Learned et al. | |
| 2003/0090837 A1 | 5/2003 | Ozue | |
| 2003/0198305 A1 | 10/2003 | Taylor et al. | |
| 2004/0080855 A1 * | 4/2004 | Tsuchiya et al. | 360/73.04 |
| 2004/0196583 A1 | 10/2004 | Suzuki et al. | |
| 2005/0036437 A1 | 2/2005 | Learned et al. | |

FOREIGN PATENT DOCUMENTS

| | | |
|---|---|---|
| JP | 03-116403 | 5/1991 |
| JP | 03-116404 | 5/1991 |
| JP | 03-116405 | 5/1991 |
| JP | 05-020788 | 1/1993 |

(Continued)

OTHER PUBLICATIONS

Voois et al., "Multichannel Signal Processing for Multiple-Head Digital Magnetic Recording", IEEE Transactions on Magnetics, vol. 30 No. 6, Nov. 1994 pp. 5100-5114.

*Primary Examiner*—Jason C Olson
(74) *Attorney, Agent, or Firm*—Robert J. Depke; Rockey, Depke & Lyons, LLC

(57) ABSTRACT

A magnetic recording and reproduction method includes the steps of recording a plurality of tracks which make a unit for a signal process for data detection by means of a recording head on a magnetic recording medium, and reproducing signals of the plural tracks by a plural number of times in different positional relationships to the tracks by means of a reproduction head which can reproduce a signal across the plural tracks of the magnetic recording medium, collecting the reproduction signals in the unit and performing a signal process for the unit to produce reproduction signals for the individual tracks.

22 Claims, 24 Drawing Sheets

FOREIGN PATENT DOCUMENTS

| | | |
|---|---|---|
| JP | 10-283620 | 10/1998 |
| JP | 04-370580 | 12/2002 |
| JP | 2003-132504 | 5/2003 |
| JP | 2003-338012 | 11/2003 |
| JP | 2004-071014 | 3/2004 |
| JP | 3664993 | 4/2005 |

* cited by examiner

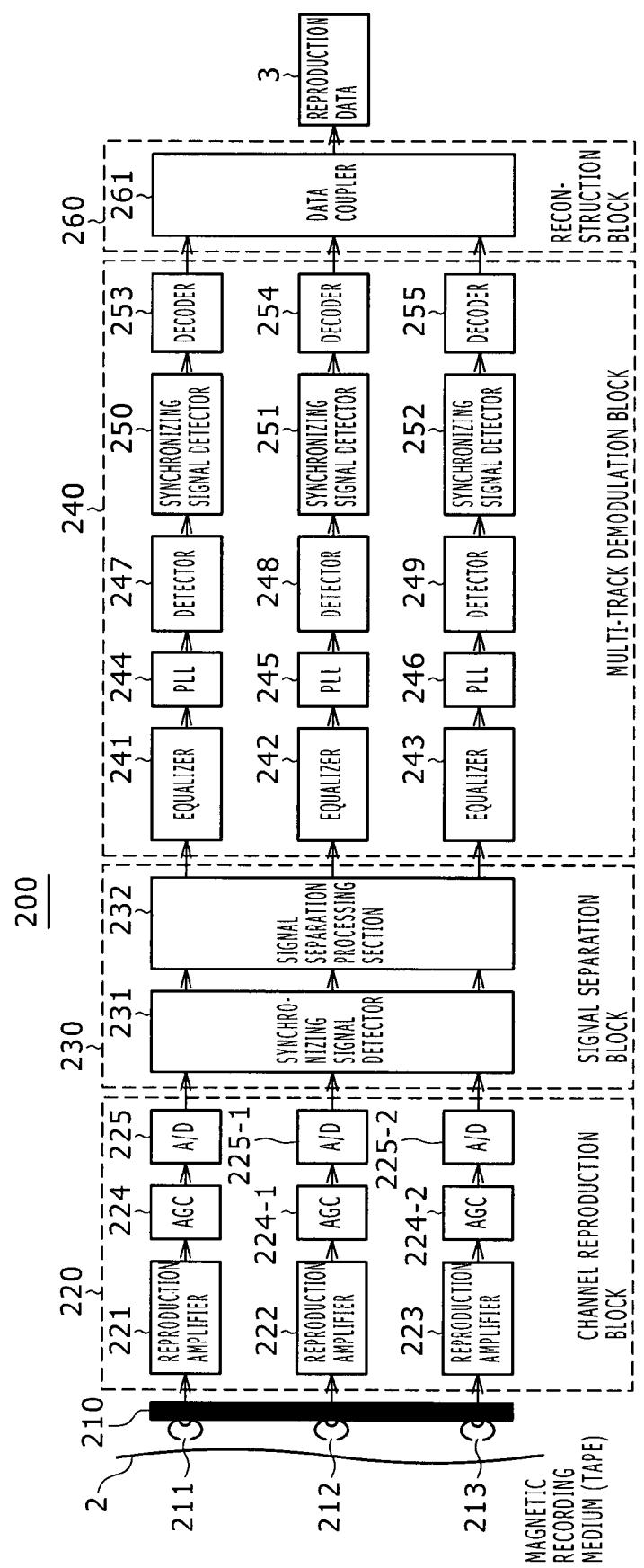

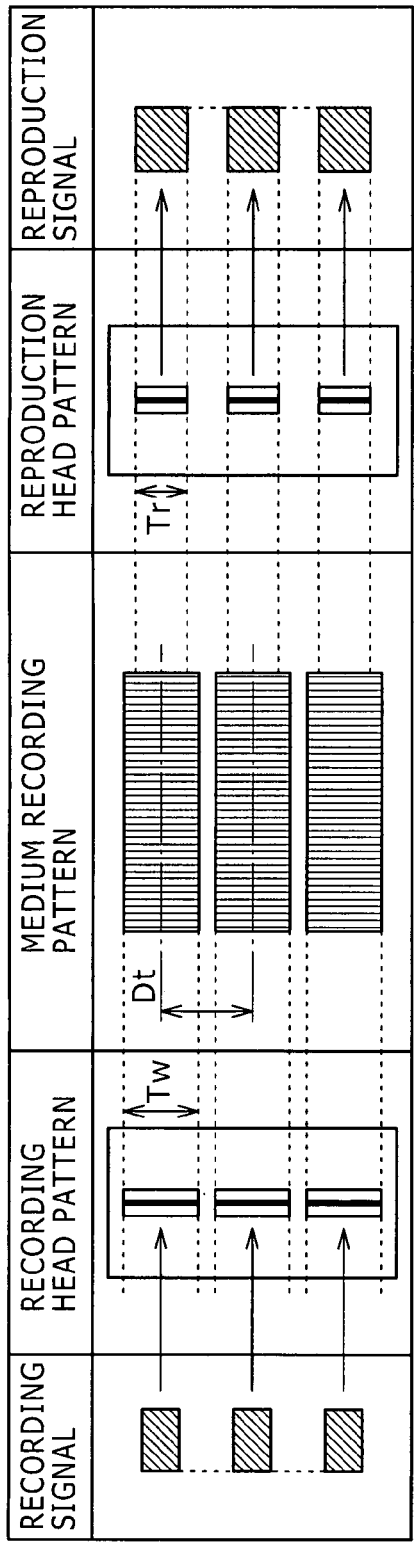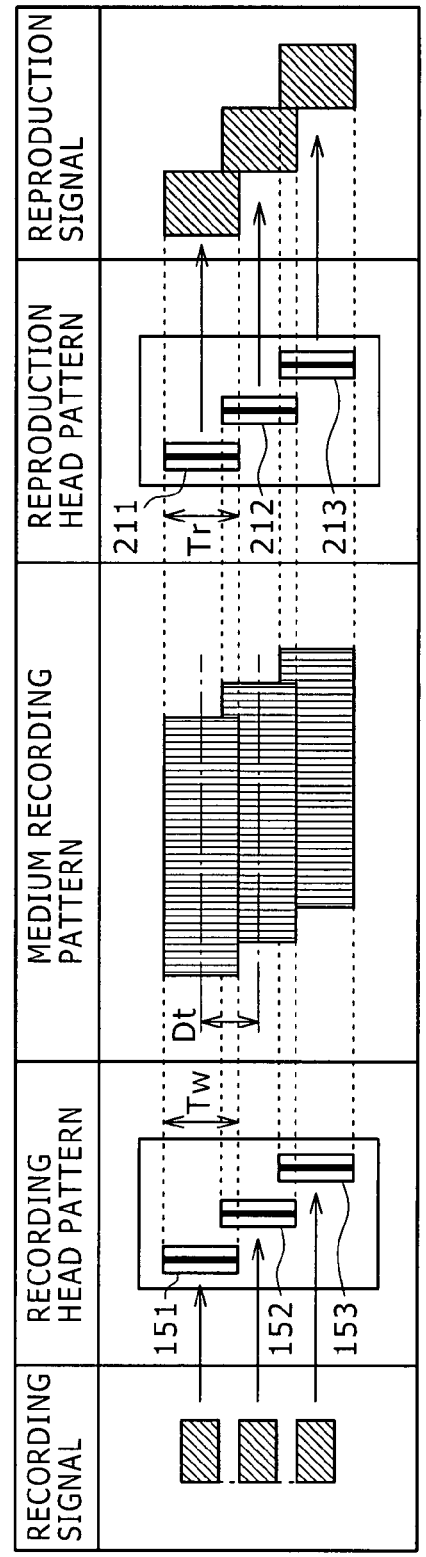

MAGNETIC RECORDING AND REPRODUCTION METHOD, RECORDING APPARATUS, REPRODUCTION APPARATUS AND MAGNETIC RECORDING MEDIUM

CROSS REFERENCES TO RELATED APPLICATIONS

The present invention contains subject matter related to Japanese Patent Application JP 2006-091822 filed with the Japan Patent Office on Mar. 29, 2006, the entire contents of which being incorporated herein by reference.

BACKGROUND OF THE INVENTION

1. Field of the Invention

This invention relates to a magnetic recording and reproduction method, a recording apparatus, a reproduction apparatus and a magnetic recording medium. A plurality of tracks are recorded on the magnetic recording medium by one or a plurality of recording heads, and signals are reproduced from the tracks by one or a plurality of reproduction heads.

2. Description of the Related Art

In recent years, it has been and is being demanded for a magnetic head to achieve higher density recording in order to increase the capacity of magnetic recording media, and a magnetic head suitable to decrease the width of tracks (such decrease is hereinafter referred to as "narrowing") has been and is being adopted. Generally, to narrowing of tracks, it is a key to enhance the accuracy in tracking servo.

As a countermeasure against the difficulty in servoing which increases as the narrowing of tracks proceeds, a non-tracking system has been proposed for and placed into practical use in magnetic tape recording and reproduction apparatus. The non-tracking system is disclosed, for example, in Japanese Patent No. 1,842,057, Japanese Patent No. 1,842,058, Japanese Patent No. 1,842,059, Japanese Patent Laid-open No. Hei 04-370580, and Japanese Patent Laid-open No. Hei 05-020788. According to the non-tracking system, data are recorded separately in blocks for identification on tracks for which double azimuth recording is performed by helical scanning so that the data can be re-constructed even if an object track is difficult to be reproduced by one tracing operation. By the non-tracking system, a margin four times or more of that for track control within one track necessary for tracking servoing in the past is permitted.

Further, the application of the non-tracking system is not limited to helical scanning, but the possibility that the non-tracking system may be used in linear recording is examined as disclosed, for example, in Japanese Patent Laid-open No. Hei 10-283620 or Japanese Patent Laid-open No. 2003-132504.

Incidentally, where a nonmagnetic support member having stretchability such as, for example, a polyester film is used for a substrate of a magnetic recording medium, even if double azimuth recording is performed, the permissible deformation amount is, for example, up to approximately twice the track width using tracking servoing. If a greater amount of deformation occurs, then a signal is difficult to be reproduced with a sufficiently high S/N ratio. On the other hand, in recording which does not have double azimuths, the width of a guard band which does not extend across tracks is necessary to be suppressed to an amount smaller than the deformation amount of the tape in order that the reliability such as the error rate may not be deteriorated even where tracking servoing is used together.

Such problems as described above arises, in signal reproduction systems which have been implemented heretofore, from significant deterioration of the signal quality by reading a signal from a plurality of tracks at the same time by at least one reproduction head. Further, in order to eliminate this, it has been devised to use a guard band or perform double azimuth recording and to cause a reproduction head to pick up a signal from one track.

However, if it is intended to achieve still higher track density, then the provision of a guard band makes an obstacle. Meanwhile, the double azimuth recording which can reduce interference from an adjacent track upon reproduction decreases the effect of narrowing when such narrowing is implemented.

This similarly applies also to the non-tracking system. In particular, although a reproduction head apparently reproduces a signal across a plurality of tracks, where timing division is applied, the signal is reproduced normally from one track, but reproduction of a plurality of tracks at the same time is not performed.

Further, where it is tried to use the non-tracking system to achieve higher track density, a signal from an adjacent track to an object track is picked up and makes noise. Therefore, the non-tracking system approaches a limit to narrowing of tracks.

As a technique in the past for a magnetic head apparatus other than those described above, a plurality of heads are disposed in one block and a plurality of data frames are recorded at a time as a system for the formation in blocks of the same azimuth in order to enhance the recording density. One of such apparatus is disclosed, for example, In Japanese Patent Laid-open No. 2003-338012 or Japanese Patent Laid-open No. 2004-071014.

In the known apparatus, since the reproduction head width is necessary to be reduced to approximately one half the width of tracks, there is a restriction that a high output of a reproduction signal is difficult to be obtained. This is disadvantageous, for example, in terms of assurance of an SN ratio. Therefore, the apparatus are not necessarily suitable for further higher density recording.

A MIMO (Multi-Input/Multi-Output) technique is known widely as a technique used for radio communication and disclosed, for example, in Japanese Patent No. 3664993.

Also a technique which uses a technique relating to the MIMO for magnetic recording is known and disclosed, for example, in IEEE Trans. Mag. Vol. 30, No. 6, Nov. 1994, p. 5100. However, a subject which appears when it is tried to place the technique into practical use such as, for example, when a reproduction head of a width greater than the width of a recorded track is not solved by the technique, has not been solved by the technique.

The invention of the present application discloses technical contents which have not been foreseen from the arts in the past when it is tried to implement practical use of the MIMO technique for a magnetic recording and reproduction apparatus, which has not been implemented by the technique of the document mentioned in the preceding paragraph as a magnetic recording method which uses the MIMO.

SUMMARY OF THE INVENTION

As described hereinabove, in the magnetic recording and reproduction systems in related art, method of decreasing the track width on a magnetic recording medium has been adopted in order to raise the recording density. However, if higher density recording is pursued as it is to decrease the track width, then a new problem arises that tracks are difficult to be traced upon reproduction. Therefore, a non-tracking system has been proposed by which, even if the position of a reproduction head is displaced somewhat from a track to be traced, a signal can be read from the track. However, in order to appropriately obtain a reproduction signal using the non-tracking system, strict restrictions are involved in setting of the reproduction head. In this regard, there is a limitation to higher density recording by decrease of the track width.

Therefore, it is demanded to provide a magnetic recording and reproduction method, a recording apparatus, a reproduction apparatus and a magnetic recording medium. Restrictions in determination of the width of a reproduction head can be reduced to implement reduction of the track width and achieve a higher recording density.

According to the embodiment of the present invention, a magnetic recording and reproduction method includes a recording step and a reproduction step. The recording step records a plurality of tracks which make a unit for a signal process for data detection by means of a magnetic head on a magnetic recording medium. The reproduction step reproduces signals of the plural tracks by a plural number of times in different positional relationships to the tracks by means of a reproduction head which can reproduce a signal across the plural tracks of the magnetic recording medium, collecting the reproduction signals in the unit, and performing a signal process for the unit to produce reproduction signals for the individual tracks.

In the magnetic recording and reproduction method, reproduction signals of individual tracks are obtained from signals reproduced across a plurality of recording tracks by the reproduction head. Consequently, the restriction in determination of the width of the reproduction head is moderated, and therefore, the width of the reproduction head can be set to a greater dimension. As a result, suitable recording and reproduction superior in reproduction characteristic can be anticipated. Further, the distance between tracks can be set smaller than the width of the reproduction head. Consequently, higher density recording can be implemented.

The magnetic recording and reproduction method may be configured such that, at the recording step, a signal of a recording wavelength equal to or greater than a minimum recording wavelength is recorded as separation patterns at unique positions of the individual tracks so that the position information of the reproduction head with respect to the plural tracks can be produced at the reproduction step. At the reproduction step, the channel estimation information is determined by the signal process based on the reproduction signals of the separation patterns.

The magnetic recording and reproduction method may be configured such that, at the reproduction step, channel estimation information corresponding to position information of the reproduction head with respect to the plural tracks is determined by the signal process. The reproduction signals for the individual tracks are determined based on the channel estimation information and the signals reproduced in the different positional relationships from the plural tracks.

At the reproduction step, tracking servo information may be used to determine the channel estimation information.

At the reproduction step, the reproduction signals of the separation patterns are used to calculate a matrix as a channel estimation function and a generalized inverse matrix to the matrix is determined, and then the reproduction signals of the individual tracks are produced from the generalized inverse matrix and a plurality of signals read out by the reproduction head.

At the reproduction step, the reproduction signals of the separation patterns are used to calculate a matrix as a channel estimation function and a minimum mean squared error method (MMSE) is applied to the matrix to produce the reproduction signals of the individual tracks.

At the recording step, a learning signal pattern for automatic gain adjustment and/or bit synchronism detection may be recorded at a position preceding to the separation patterns.

At the recording step, a synchronizing signal pattern to be used for detection of the position of the separation patterns may be recorded at a position preceding to the separation patterns.

In order to prevent a track of a neighboring unit from being reproduced, the magnetic recording and reproduction method may be configured such that, at the recording step, where a plurality of units each including a plurality of tracks which make a unit of a signal process for data detection are recorded on the magnetic recording medium, a guard area in which recording is inhibited is disposed between adjacent ones of the units.

The magnetic recording and reproduction method may be configured such that, at the recording step, the single recording head is shifted to record the plural tracks, and at the reproduction step, the single reproduction head is shifted to produce a plurality of reproduction signals from the plural tracks. Alternatively, the magnetic recording and reproduction method may be configured such that, at the recording step, a plurality of recording head elements of the recording head are used to record the plural tracks, and at the reproduction step, a plurality of reproduction head elements of the recording head are used to produce a plurality of reproduction signals from the plural tracks.

The magnetic recording and reproduction method may be configured such that the width of the plural recording head elements is set such that the width of those ones of the plural tracks which are positioned at the opposite ends is greater than the width of the other track or tracks while the width of the reproduction head elements is set smaller than the width of the tracks at the opposite ends. At the recording step, where a plurality of units each including the plural tracks are to be recorded, the units are recorded without a gap left therebetween. The magnetic recording and reproduction method may be configured such that the widths of the plural recording head elements are set equal to each other while the width of the reproduction head elements at the opposite ends of the plural reproduction heads is set smaller than the width of the other reproduction head or heads. At the recording step, where a plurality of units each including the plural tracks are to be recorded, the units are recorded without a gap left therebetween. This prevents tracks of adjacent units from being reproduced.

With the magnetic recording and reproduction method, reproduction signals of individual tracks are obtained from signals reproduced across a plurality of recording tracks by each of the reproduction head elements of the reproduction head. Consequently, the restriction in determination of the width of the reproduction head is moderated, and therefore, the width of the reproduction head can be set to a greater dimension. As a result, suitable recording and reproduction superior in reproduction characteristic can be anticipated. Further, the distance between tracks can be set smaller than the width of the reproduction head. Consequently, higher density recording can be implemented.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a block diagram showing a configuration of a reproduction apparatus of the magnetic recording and reproduction apparatus;

FIGS. 3A and 3B are views illustrating a recording head pattern, a medium recording pattern and a reproduction head pattern by a linear system in related art and a recording head pattern, a medium recording pattern and a reproduction head pattern by the magnetic recording and reproduction apparatus;

DETAILED DESCRIPTION OF THE PREFERRED EMBODIMENTS

First Embodiment

Figure 1:
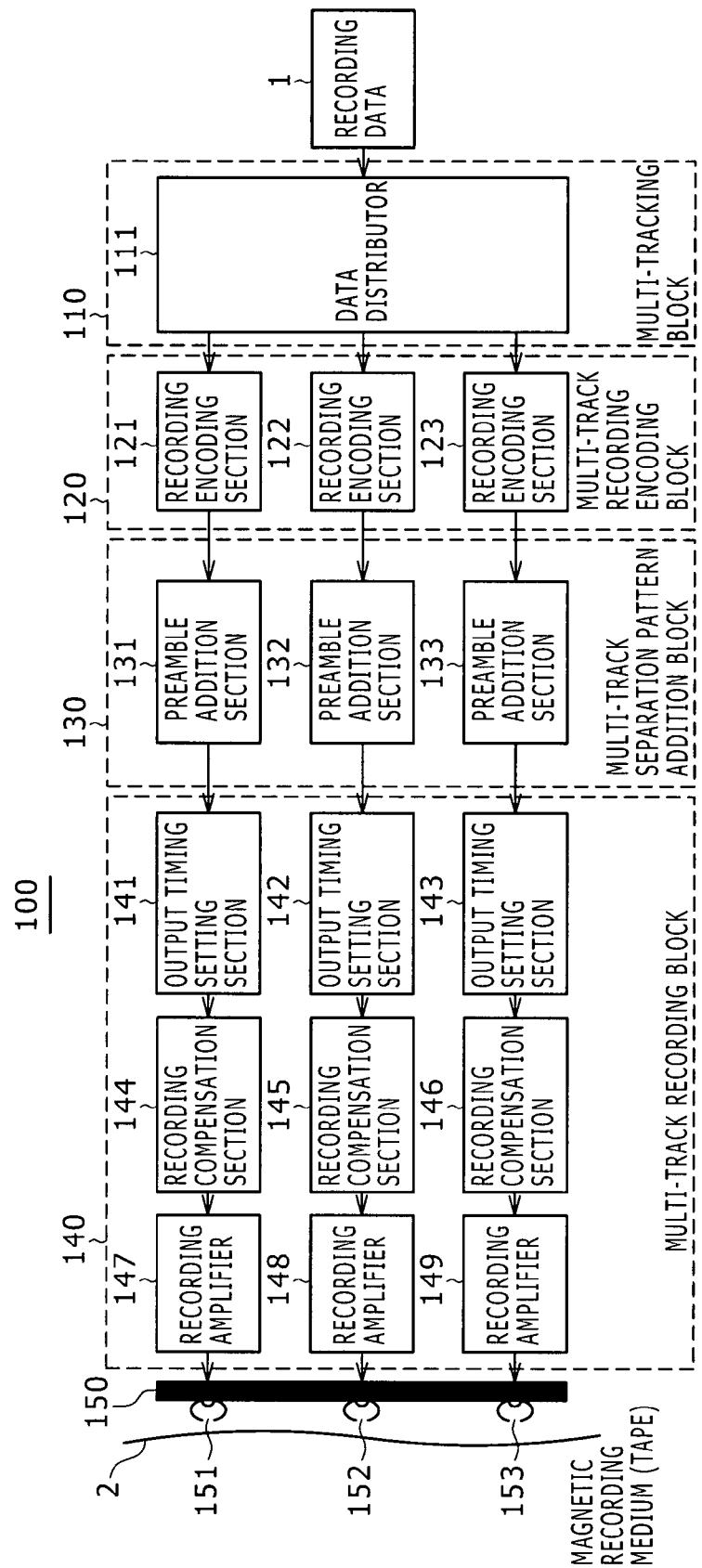
FIG. 1 is a block diagram showing a configuration of a recording apparatus of a magnetic recording and reproduction apparatus according to a first embodiment the present invention.

FIG. 1 shows a configuration of a recording apparatus of a magnetic recording and reproduction apparatus according to a first embodiment of the present invention. It is to be noted that, in the magnetic recording and reproduction apparatus of the present embodiment, the number of recording heads is M and the number of reproduction heads is N.

Referring to FIG. 1, the recording apparatus 100 shown includes a multi-tracking block 110, a multi-track recording encoding block 120, a multi-track separation pattern addition block 130, a multi-track recording block 140, and a recording head array 150.

The multi-tracking block 110 includes a data distributor 111 which distributes recording data 1 into a number of data groups equal to the number (M=3) of recording heads 151, 152 and 153 provided on the recording head array 150. The multi-track recording encoding block 120 includes M recording encoding sections 121, 122 and 123 for encoding the recording data distributed by the data distributor 111. The multi-track separation pattern addition block 130 includes M preamble addition sections 131, 132 and 133 for adding a preamble to the encoded data. The multi-track recording block 140 includes M output timing setting sections 141, 142 and 143 for providing a desired timing to the recording data to which the preambles are added, M recording compensation sections 144, 145 and 146 for performing a recording compensation process, and M recording amplifiers 147, 148 and 149 for individually driving the recording heads 151, 152 and 153 based on the recording data after the recording compensation process.

Figure 21:
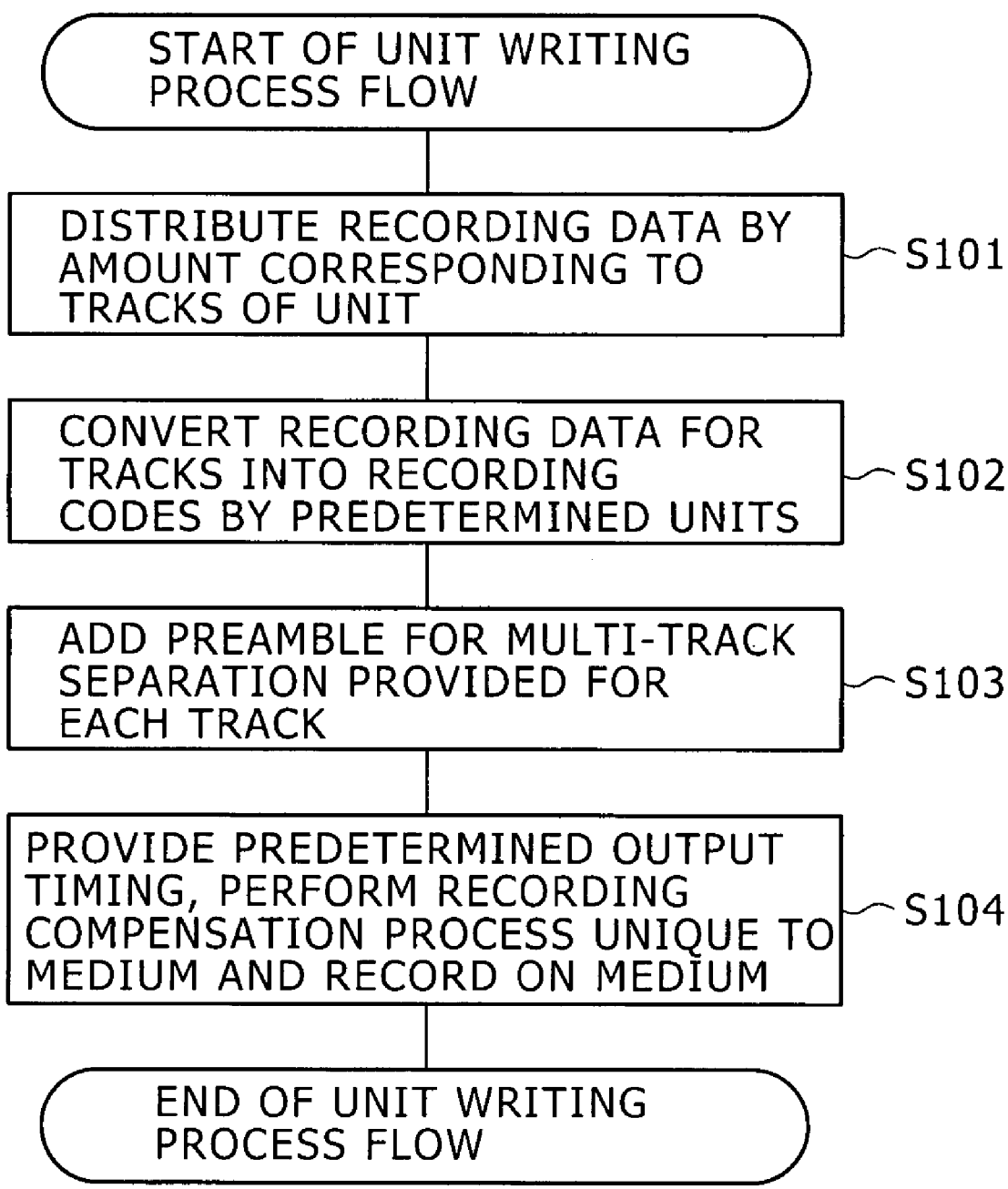
FIG. 21 is a flow chart illustrating recording action of the recording apparatus of FIG. 1.

Referring to FIG. 21, in the recording apparatus 100, recording data 1 inputted are distributed into a number of data groups (data for individual tracks) equal to the number (M=3) of recording heads 151, 152 and 153 by the multi-tracking block 110 (step S101). The distributed data of the data groups are individually encoded into codeword strings taking the recording and reproduction characteristic of a magnetic recording medium 2 into consideration by the recording encoding sections 121, 122 and 123 of the multi-track recording encoding block 120. To each of the codeword strings, information necessary for data demodulation such as a synchronizing signal pattern is added (step S102).

Then, a preamble is placed at a predetermined position of the thus produced codeword strings by the preamble addition sections 131, 132 and 133 of the multi-track separation pattern addition block 130 (step S103). A preamble code is a separation pattern used to separate signals of individual tracks from each other as a processing unit by a predetermined signal process from reproduction signals read out from reproduction heads. The preamble code is produced taking a rule of the codeword strings generated by the recording encoding sections 121, 122 and 123 of the multi-track recording encoding block 120 into consideration.

Further, the recording code strings for the individual tracks are provided with a desired timing by the output timing setting sections 141, 142 and 143 of the multi-track recording block 140 and undergo a recording compensation process for the optimization in recording on the magnetic recording medium 2 by the recording compensation sections 144, 145 and 146. Thereafter, the recording code strings of the individual tracks are converted from a voltage into current by the recording amplifiers 147, 148 and 149 and sent to the recording heads 151, 152 and 153 so that they are recorded on the magnetic recording medium 2 by the recording heads 151, 152 and 153, respectively (step S104).

Now, a configuration of a reproduction apparatus of the magnetic recording and reproduction apparatus of the embodiment of the present invention is described with reference to FIG. 2.

The reproduction apparatus 200 includes a reproduction head array 210, a channel reproduction block 220, a signal separation block 230, a multi-track demodulation block 240 and a reconstruction block 260.

The reproduction head array 210 includes N (for example, 3) reproduction heads 211, 212 and 213 for reading out a signal from tracks recorded on the magnetic recording medium 2.

The channel reproduction block 220 includes N reproduction amplifiers 221, 222 and 223 for amplifying the signals reproduced by the N reproduction heads 211, 212 and 213 mounted on the reproduction head array 210, respectively. The channel reproduction block 220 further includes N AGCs 224, 224-1 and 224-2 for controlling the gain of the N reproduction amplifiers 221, 222 and 223 so that the reproduction levels of the outputs of the reproduction amplifiers 221, 222 and 223 may be a predetermined value, respectively. The channel reproduction block 220 further includes A/D converters 225, 225-1 and 225-2 for quantizing the output of the AGCs 224, 224-1 and 224-2 into a digital value of a predetermined bit width. It is to be noted that the channel reproduction block 220 may further include low-pass filters disposed immediately preceding to the A/D converters for removing unnecessary high frequency components as occasion demands. Further, the AGCs may be provided otherwise at the stage following the A/D converters so that the gain control is performed after the quantization.

The signal separation block 230 includes a synchronizing signal detector 231 for detecting a synchronizing signal for identifying a start position of the separation patterns from the outputs of the A/D converters 225, 225-1 and 225-2. The signal separation block 230 further includes a signal separation processing section 232 for specifying the start position of the separation patterns based on the synchronizing signal detected by the synchronizing signal detector 231 and performing channel estimation arithmetic operation and signal separation arithmetic operation using the specified separation patterns to separate reproduction signals of individual tracks from reproduction signals for one unit reproduced from the reproduction heads 211, 212 and 213.

The multi-track demodulation block 240 includes M equalizers 241, 242 and 243 for performing an equalization process for reproduction signals separated for individual tracks, and M PLLs (Phase-Locked Loops) 244, 245 and 246 for establishing bit synchronism from the outputs of the equalizers 241, 242 and 243. The multi-track demodulation block 240 further includes M detectors 247, 248 and 249, which may be, for example, Viterbi detectors, for binarizing the reproduction signals of the individual tracks using the bit synchronizing signals produced by the PLLs 244, 245 and 246 to produce codeword strings. The multi-track demodulation block 240 further includes M synchronizing signal detectors 250, 251 and 252 for individually detecting the synchronizing signals on the codeword strings from the binarized reproduction signals outputted from the detectors 247, 248 and 249, respectively. The multi-track demodulation block 240 further includes M decoders 253, 254 and 255 for individually specifying the start position of data from the synchronizing signals in data regions detected by the synchronizing signal detectors 250, 251 and 252 and decoding data strings from the codeword strings, respectively.

The reconstruction block 260 includes a data coupler 261 for connecting the data of tracks outputted from the M decoders 253, 254 and 255 through operation reverse to that upon recording to restore reproduction data 3.

Figure 22:
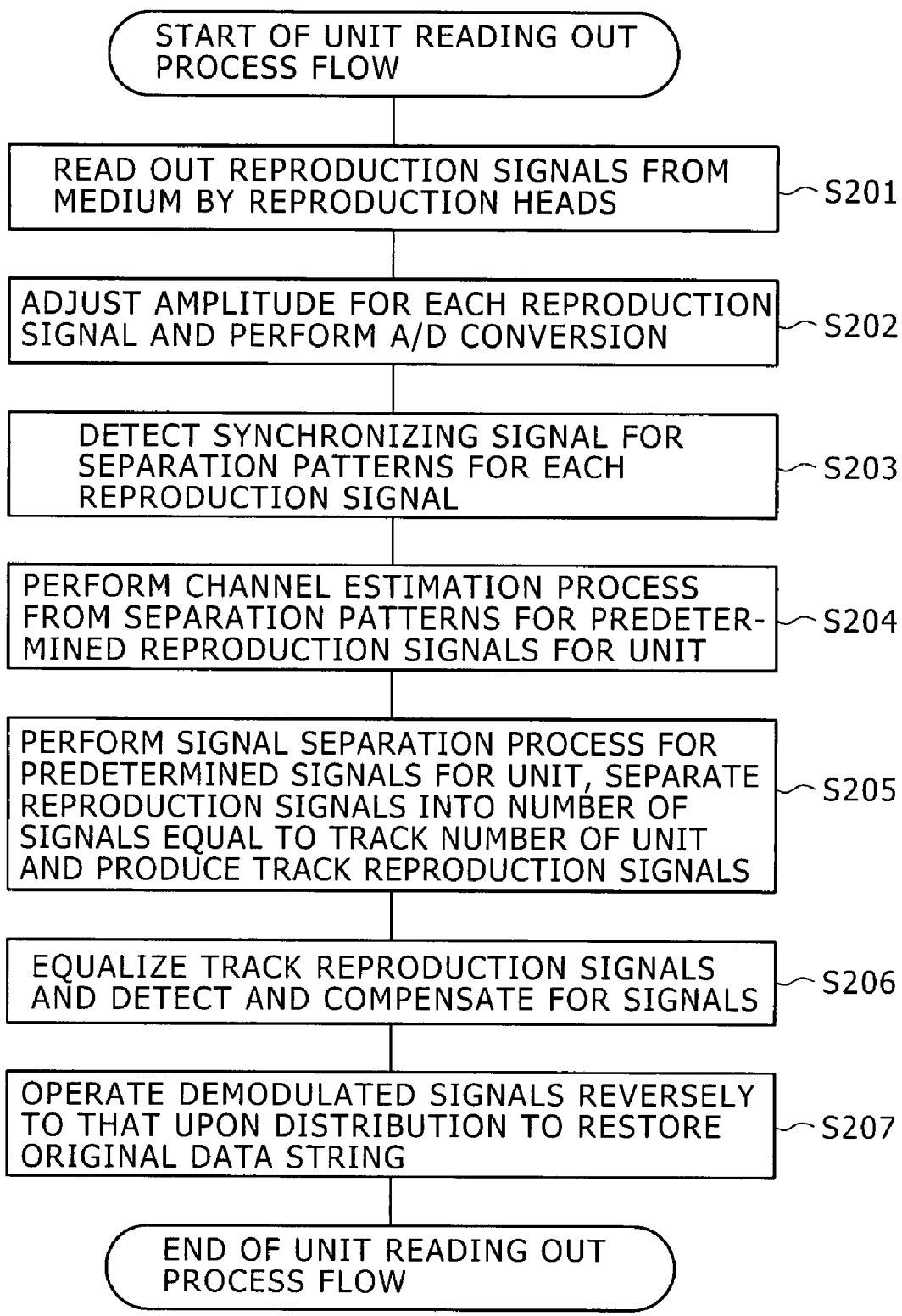
FIG. 22 is a flow chart illustrating reproduction action of the reproduction apparatus of FIG. 2.

Referring now to FIG. 22, in the reproduction apparatus 200, signals are reproduced from tracks of the magnetic recording medium 2 by the N (for example, three) reproduction heads 211, 212 and 213 (step S201). Then, the amplification level of the outputs of the reproduction amplifiers 221, 222 and 223 is adjusted by the AGCs 224, 224-1 and 224-2, respectively, and the outputs of the AGCs 224, 224-1 and 224-2 are converted into digital values by the A/D converters 225, 225-1 and 225-2, respectively, and then outputted to the synchronizing signal detector 231 (step S202). The synchronizing signal detector 231 performs detection of a synchronizing signal for identification of a start position of the separation patterns from the A/D converters 225, 225-1 and 225-2 (step S203). The signal separation processing section 232 specifies the start position of the separation pattern disposed in each of the reproduction signals based on the detected synchronizing signals and performs predetermined channel estimation arithmetic operation using the separation pattern (step S204). Further, the signal separation processing section 232 performs a process of producing a reproduction signal for each track from a result of the channel estimation arithmetic operation and the reproduction signals for one unit (step S205).

Thereafter, an equalization process is performed for the reproduction signals separated for the individual tracks by the equalizers 241, 242 and 243 of the multi-track demodulation block 240. Then, binarization of the reproduction signals of the individual tracks is performed by the detectors 247, 248 and 249 using the bit synchronizing signals produced by the PLLs 244, 245 and 246, respectively, to produce codeword strings for the individual tracks. Further, synchronizing signals on the codeword strings for the individual tracks are detected by the synchronizing signal detectors 250, 251 and 252, and then decoding of data strings from the codeword strings of the individual tracks by the decoders 253, 254 and 255 is performed. Then, the data of the tracks are connected to each other by the reconstruction block 260 to obtain reproduction data (step S206). The reproduction data of the tracks for one unit produced in such a manner as described above are connected to each other by the multi-track demodulation block 240 to restore original recording data (step S207).

Now, a configuration of the recording head array and the reproduction head array in the recording and reproduction apparatus described above is described in comparison with a typical configuration of the existing recording head array and the existing reproduction head array.

FIG. 3A shows a recording head pattern, a medium recording pattern and a reproduction head pattern according to the existing linear recording system. In FIG. 3A, the recording head width is represented by Tw, and it is assumed that all recording heads have the equal width Tw. Meanwhile, the reproduction head width is represented by Tr, and it is assumed that all reproduction heads have the equal width Tr.

Further, the distance between the centers of tracks of adjacent ones of the recording heads is represented by Dt. Further it is assumed that magnetization directions of the tracks are same, that is, the tracks have the same azimuth direction.

As seen in FIG. 3A, in the configuration of the existing recording and reproduction head arrays, the distance Dt is greater than the recording head width Tw since the recording heads are disposed in a spaced relationship from each other in the track widthwise direction. Meanwhile, the reproduction head width Tr is set smaller than the pattern width recorded on a medium, that is, the recording head width Tw so that a signal is obtained only from a single track by each reproduction head.

It is to be noted that, in the recording head array 150, in order to mount a plurality of recording heads on a single module, it is necessary to provide a fixed distance between adjacent ones of the recording heads. Therefore, where a plurality of recording heads are disposed in series in the track widthwise direction as seen in FIG. 3A, the distance Dt is greater than the recording head width Tw. On the other hand, since the reproduction head width Tr is smaller than the recording head width Tw, the reproduction head width Tr is further smaller than the distance Dt.

As described above, with the existing configuration described above, since signals of different tracks are read separately from each other, it is difficult to set the reproduction head width Tr to a great dimension. On the other hand, if the recording head width Tw is decreased or medium recording patterns are recorded in a partially overlapping relationship with each other in the track widthwise direction in order to implement higher track density, then the reproduction head width Tr must be set to a further smaller dimension. This makes mounting of the reproduction heads difficult and may possibly deteriorate the reproduction characteristic.

FIG. 3B shows a recording head pattern, a medium recording pattern and a reproduction head pattern according to the magnetic recording and reproduction apparatus of the present embodiment. As seen in FIG. 3B, in the magnetic recording and reproduction apparatus of the present embodiment, the recording heads are disposed in such a positional relationship that a predetermined distance is provided between adjacent ones of the heads in an advancing direction of the magnetic recording medium while tracks written by adjacent ones of the recording heads overlap with each other in the track widthwise direction. In other words, the distance Dt is set to a value lower than the recording head width Tw. Therefore, the medium recording patterns of two adjacent ones of the tracks partially overlap with each other in the track widthwise direction. Further, since the recording heads are disposed in a displaced relationship from each other in the advancing direction of the magnetic recording medium, in a region in which two medium recording patterns overlap with each other, that one of the medium recording patterns which is recorded by a recording head which precedes in time is overwritten by the other medium recording pattern recorded by the recording head which records later in time.

On the other hand, also the reproduction heads are disposed in a displaced relationship from each other in the advancing direction of the magnetic recording medium similarly to the recording heads. Here, the reproduction head width Tr may not be set smaller than the recording head width Tw as in the existing arrangement and, for example, may be set equal to or greater than the recording head width Tw. Reproduction signals obtained from the individual reproduction heads may each include a signal from an adjacent track. This is because reproduction signals of individual tracks can be separated from each other by a signal process from reproduction signals individually reproduced over a plurality of tracks by a plurality of reproduction heads.

In the magnetic recording and reproduction apparatus of the present embodiment, since the reproduction head width Tr can be set to a comparatively great dimension in this manner, preferable recording and reproduction superior in reproduction characteristic can be achieved. Further as regards mounting, since the distance necessary to mount a plurality of recording heads or reproduction heads on a single module can be assured in the advancing direction of the magnetic recording medium, also the problem in mounting is eliminated. Further, the distance Dt between the tracks can be set smaller than the width Tr of the reproduction heads, and consequently, higher track density can be implemented.

Now, measures for separating reproduction signals of individual tracks from reproduction signals each obtained over a plurality of tracks by a plurality of reproduction heads are described.

Figure 4:
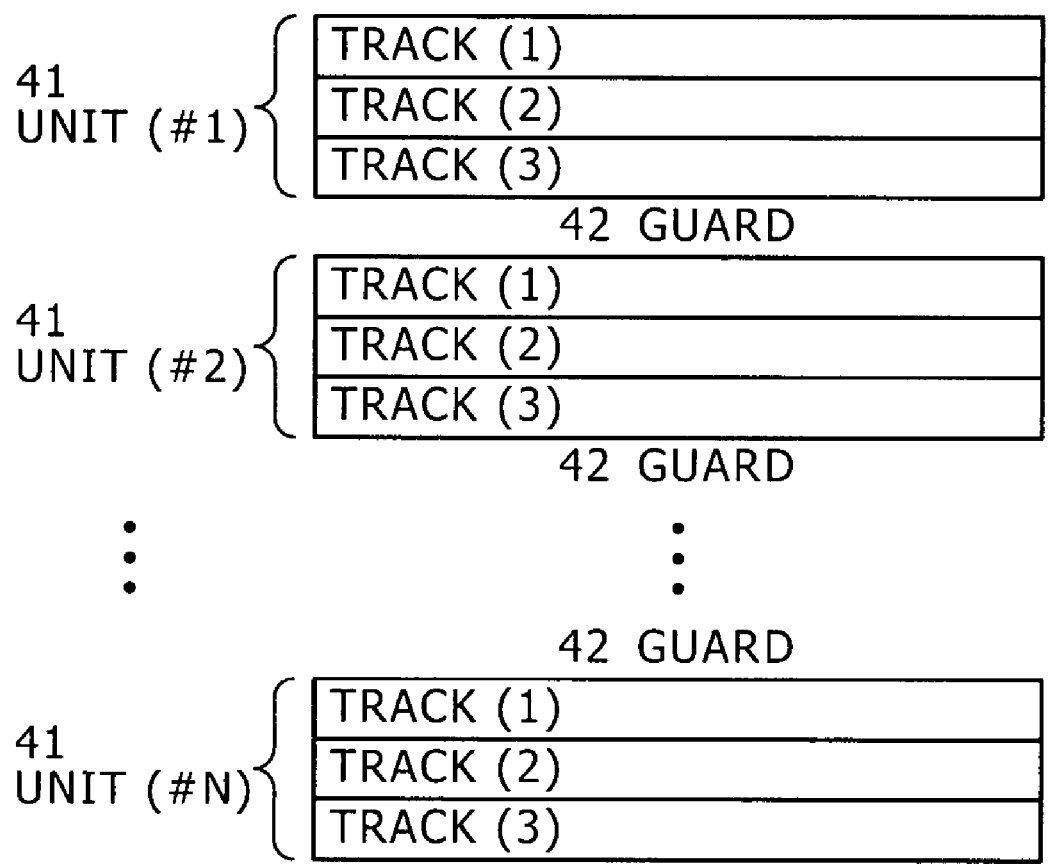
FIG. 4 is a diagrammatic view illustrating a concept of one unit of tracks recorded on a magnetic recording medium by the magnetic recording and reproduction apparatus.

FIG. 4 illustrates a concept of one unit of tracks recorded on a magnetic recording medium.

One group of M tracks recorded on a magnetic recording medium by M recording heads is hereinafter referred to as "unit". In FIG. 4, the track (1), track (2) and track (3) are those recorded on the magnetic recording medium by the M recording heads 151, 152 and 153 of the recording apparatus 100, respectively. The group of the track (1), track (2) and track (3) makes up a unit 41. Between different units 41, for example, between the first unit (#1) and the second unit (#2), a region called guard 42 in which nothing is recorded is assured. The guard 42 is provided in order to prevent tracks of adjacent units from being reproduced.

Figure 5:
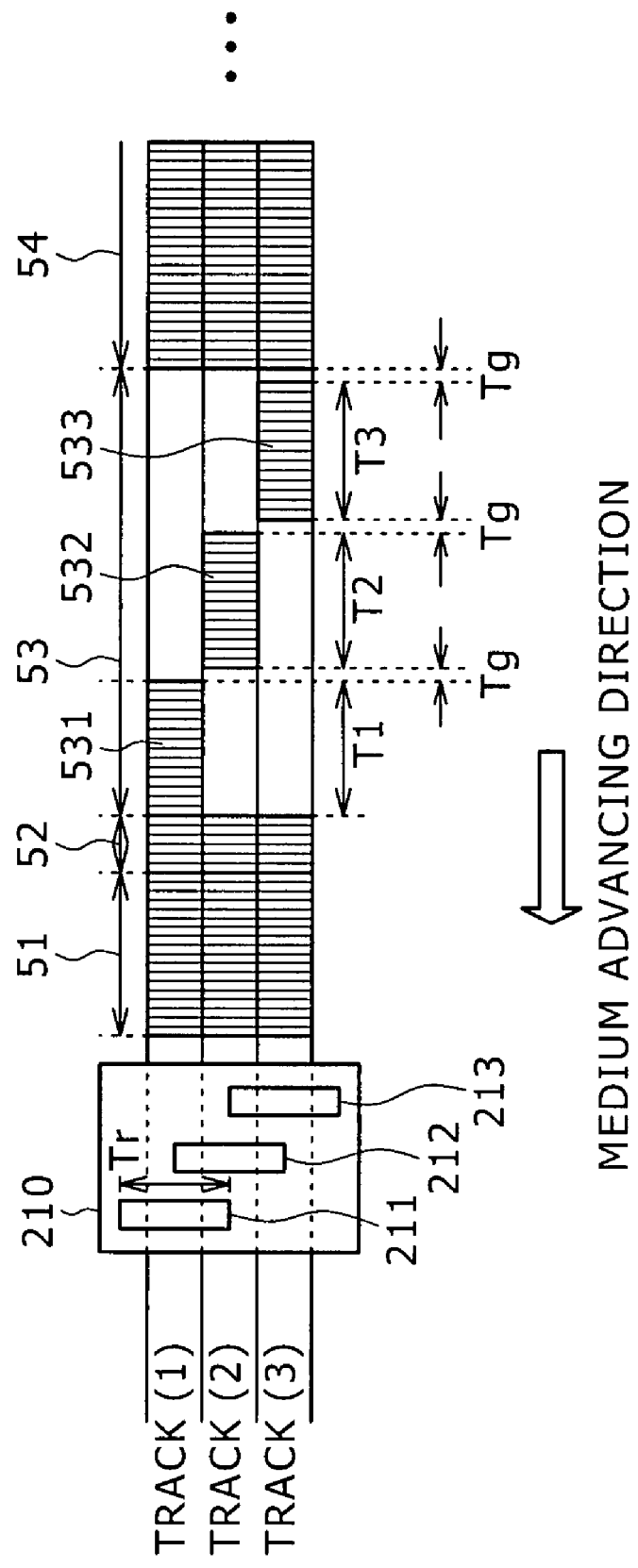
FIG. 5 is a schematic view illustrating an example of separation patterns recorded on a magnetic recording medium by the magnetic recording and reproduction apparatus.

FIG. 5 illustrates an example of separation patterns recorded on a magnetic recording medium.

Referring to FIG. 5, a first preamble 51, a SYNC 52 and a second preamble 53 are recorded in order from the top of the magnetic recording medium as patterns necessary for separation of signals of individual tracks from signals reproduced each across a plurality of tracks by the reproduction heads 211, 212 and 213. Data 54 are recorded next to the second preamble 53. Here, the data are a recording code string produced by the recording encoding sections 121, 122 and 123 of the recording apparatus 100 upon recording. The first preamble 51, SYNC 52 and second preamble 53 are added by the preamble addition sections 131, 132 and 133, respectively.

Upon reproduction, the first preamble 51 is used principally as a learning signal for gain control of the reproduction amplifiers 221, 222 and 223 by the AGCs 224, 224-1 and 224-2 of the reproduction apparatus 200 of FIG. 2. Further, the first preamble 51 is used also for learning of bit synchronism detection as occasion demands. The SYNC 52 is used as a synchronizing signal for detecting the start position of the second preamble 53 by the synchronizing signal detector 231 at the preceding stage. The second preamble 53 is used in a signal process for separating reproduction signals of individual tracks from signals reproduced each across a plurality of tracks by a plurality of reproduction heads by the signal separation processing section 232. The data 54 are used in various components of the multi-track demodulation block 240.

In the second preamble 53, predetermined signals 531, 532 and 533 are recorded for the individual tracks such that the physical positions thereof do not overlap with each other. In particular, as seen in FIG. 5, the predetermined recorded signals 531, 532 and 533 are recorded in a T1 interval of the track (1), a T2 interval of the track (2) and a T3 interval of the track (3), respectively. Consequently, the number of types of separation patterns is three corresponding to the number of tracks. Further, in the second preamble 53, a predetermined time lag Tg is provided between adjacent ones of the recorded signals 531, 532 and 533 of the different tracks so that the recorded signals 531, 532 and 533 of the tracks may not overlap with each other in time.

It is to be noted that the separation patterns are recorded with a predetermined recording wavelength equal to or greater than a minimum recording wavelength.

The signal separation processing section 232 uses reproduction signals of the separation patterns to perform channel estimation arithmetic operation to produce channel estimation information which may be required in order to separate the reproduction signals of the individual tracks at a succeeding stage. The channel estimation information corresponds to information of the positions in the track widthwise direction of the individual reproduction heads 211, 212 and 213 corresponding to a unit which includes a plurality of tracks. In other words, the channel estimation information represents by what proportion each of the reproduction heads 211, 212 and 213 overlaps in position with any other track in the unit.

Further, the signal separation processing section 232 performs predetermined separation arithmetic operation from the thus produced channel estimation information and reproduction signals reproduced by the reproduction heads 211, 212 and 213 to separate signals of the individual channels from signals each produced over a plurality of tracks by the reproduction heads 211, 212 and 213.

It is to be noted that, in the example of FIG. 5, the reproduction head width Tr of the reproduction heads 211, 212 and 213 is equal to 1.5 times the head width of the recording heads not shown so that reproduction of signals from a plurality of tracks is performed by each of the reproduction heads 211, 212 and 213. In this instance, the reproduction head 211 reproduces signals across the two tracks (1) and (2); the reproduction head 212 reproduces signals across the three tracks (1), (2) and (3); and the reproduction head 213 reproduces signals across the tracks (2) and (3).

Accordingly, by the signal separation process, the signal of the track (1) is produced from the signal from the reproduction head 211 and the signal from the reproduction head 212. The signal of the track (2) is produced from the signals from the reproduction head 211, reproduction head 212 and reproduction head 213. The signal of the track (3) is produced from the signal from the reproduction head 212 and the signal from the reproduction head 213.

Particularly, a signal of the track (2) can be extracted using three reproduction signals from three different places of track positions displaced from each other. Accordingly, when compared with an alternative case wherein one track is reproduced only once by one reproduction head as in the existing recording and reproduction apparatus, the positional displacement amount of a reproduction head from a track with which good reproduction can be assured can be increased.

It is to be noted that, while, in the example of the unit 41 shown in FIG. 4, reproduction of a signal from a track of a neighboring unit 41 is prevented by means of the guard 42 disposed between units 41, no guard 42 may be disposed, that is, the units may be disposed closely to each other in the track widthwise direction.

Different methods for preventing reproduction of a signal from a track of a neighboring unit may be used. For example, a method is available wherein the width of the recording heads is set such that the tracks on the outer sides (on the opposite sides) of each unit have a width greater than the other track or tracks while the width of the reproduction heads is set smaller than the width of the recording heads corresponding to the outer side tracks. Another method is available wherein all tracks have an equal width while the reproduction heads corresponding to the outer side tracks of each unit have a width smaller than the width of the other reproduction head or heads.

Meanwhile, in order to obtain position information of the individual reproduction heads with respect to a unit, also it is possible to use tracking servo information without relying upon such separation patterns as described hereinabove. In this instance, a positional relationship between recording patterns in a unit and the individual reproduction heads is given by the tracking servo information. Such positional relationships are collected in a unit to produce channel estimation information. Thereafter, separation of signals of the individual tracks can be performed by predetermined signal separation arithmetic operation from the produced channel estimation information and signals reproduced by the reproduction heads.

It is to be noted that the means for obtaining position information of the reproduction heads using separation patterns and the means for obtaining positional information using tracking servo information may be used alternatively or simultaneously.

Now, a modification to the embodiment described above is described.

Figure 6:
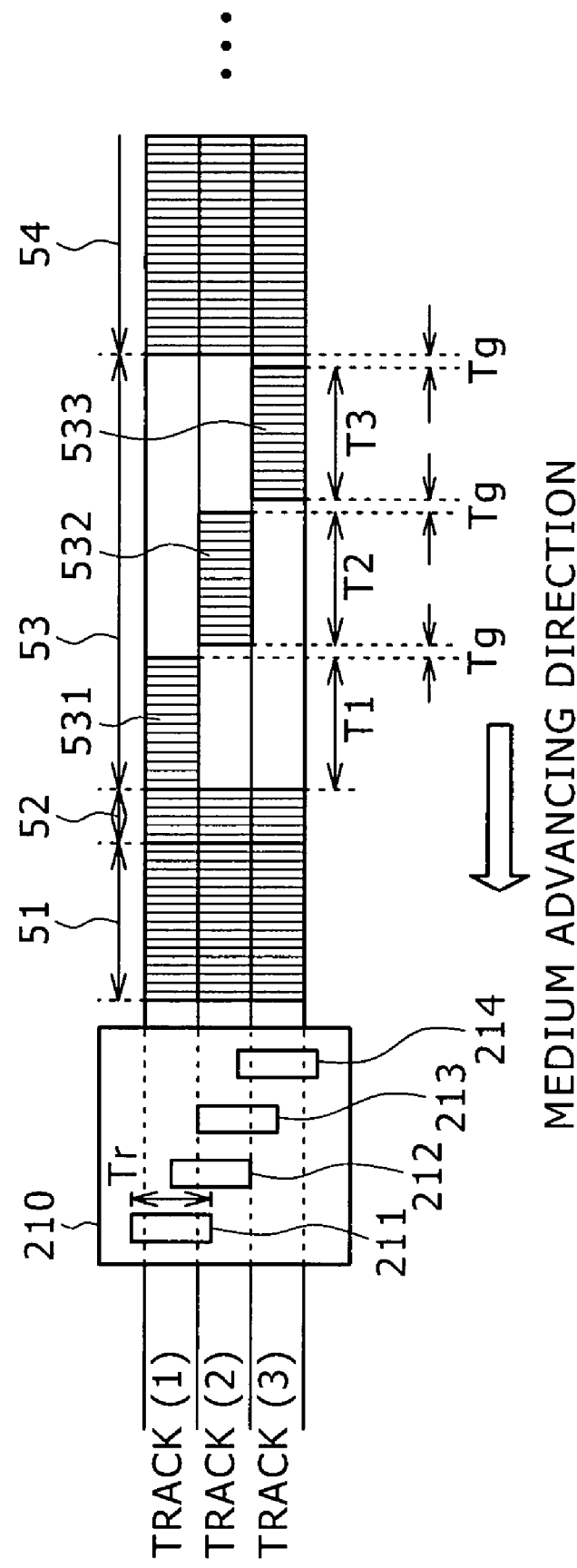
FIG. 6 is a similar view but illustrating another example of separation patterns where the number of recording heads and tracks is three and the number of reproduction heads is four.

FIG. 6 illustrates an example of separation patterns recorded on a magnetic recording medium where the number of recording heads is three and the number of reproduction heads is four.

The reproduction head width Tr of reproduction heads 211, 212, 213 and 214 is set greater than the width of the recording heads not shown. The reproduction head 211 reproduces signals across the track (1) and the track (2). The reproduction head 212 reproduces signals across the track (1) and the track (2). The reproduction head 213 reproduces signals across the track (2) and the track (3). Also the reproduction head 214 reproduces signals across the track (2) and the track (3).

In this instance, by the signal separation process, the signal of the track (1) is produced from the signals from the reproduction head 211 and the reproduction head 212. The signal of the track (2) is produced from the signals from the reproduction head 211, reproduction head 212, reproduction head 213 and reproduction head 214. The signal of the track (3) is produced from the signals from the reproduction head 213 and the reproduction head 214.

Here, particularly the signal of the track (2) can be extracted using the four reproduction signals reproduced from four places whose track positions are displaced from each other. Accordingly, when compared with an alternative case wherein one track is reproduced only once by one reproduction head as in the existing recording and reproduction apparatus, the positional displacement amount of a reproduction head from a track with which good reproduction can be assured can be increased.

Also in the present example, such means for preventing a signal from being reproduced from a track of a neighboring unit as, for example, to dispose a guard 42 between units as seen in FIG. 4 is adopted.

Also where the number of reproduction heads is set greater than the number of recording heads in this manner, the signal separation processing section 232 can separate signals of individual tracks from signals reproduced each across a plurality of tracks by the reproduction heads 211, 212, 213 and 214 by producing channel estimation information using reproduction signals of separation patterns and data information read in by the reproduction heads 211, 212, 213 and 214 similarly as described above.

Now, particular examples of the channel estimation arithmetic operation and the signal separation arithmetic operation by the signal separation processing section 232 are described.

The original data vector recorded by each recording head at a predetermined sample position k is given by

[expression (1)]

$$X(k)=[x1(k)x2(k)x3(k)]^T \quad (1)$$

where T represents transpose. Meanwhile, reproduction signals reproduced from a plurality of tracks by each recording head is represented by

[expression (2)]

$$Y(k)=[y1(k)y2(k)y3(k)]^T \quad (2)$$

At this time, the corresponding relationship between the reproduction signals reproduced by each reproduction head and recording data can be represented by a matrix of N rows and M columns, in this instance, three rows and three columns. The relationship between the expression (1) and the expression (2) is given by the following expression (3) using a matrix H:

[expression (3)]

$$Y(k)=H\cdot X(k) \quad (3)$$

Accordingly, by multiplying the expression (3) from the left by a generalized inverse matrix to the matrix, the following expression (4)

[expression (4)]

$$X(k)=H^{-1}\cdot Y(k) \quad (4)$$

is obtained. Thus, original data by each recording head can be determined from the reproduction signals.

In particular, the signal separation processing section 232 performs arithmetic operation of the matrix H of the expression (3) as the channel estimation arithmetic operation and then performs arithmetic operation of a generalized inverse matrix (which may be merely called inverse matrix if the matrix is a square matrix and besides is regular) to the matrix and arithmetic operation of the expression (4) as the signal separation arithmetic operation. By such operation as described above, a reproduction signal of each track can be obtained from reproduction signals reproduced each across a plurality of tracks by the reproduction heads.

The matrix H depends upon the number of tracks of a unit and the number of corresponding reproduction signals. In the example of FIG. 5, the number of tracks (number of recording heads) of a unit is three and the number of reproduction signals (number of reproduction heads) is three. Therefore, the matrix H is represented by a matrix of three rows and three columns as given by the following expression (5):

[expression (5)]

$$H = \begin{bmatrix} h_{11} & h_{12} & h_{13} \\ h_{21} & h_{22} & h_{23} \\ h_{31} & h_{32} & h_{33} \end{bmatrix} \quad (5)$$

Meanwhile, in the example of FIG. 6, the number of tracks (number of recording heads) of a unit is three and the number of reproduction signals (number of reproduction heads) is four. Therefore, the matrix H is represented as a matrix of four rows and three columns as given by the following expression (6):

[expression (6)]

$$H = \begin{bmatrix} h_{11} & h_{12} & h_{13} \\ h_{21} & h_{22} & h_{23} \\ h_{31} & h_{32} & h_{33} \\ h_{41} & h_{42} & h_{43} \end{bmatrix} \quad (6)$$

Now, an example of calculation of the matrix H as the channel estimation information is described.

Calculation of the matrix H is performed within a period of the second preamble 53 shown in FIG. 5, that is, within periods of the T1 interval, T2 interval and T3 interval for the individual tracks. In the expression (3), for the T1 interval, k is set to k=t1; for the T2 interval, k is set to k=t2, and for the T3 interval, k is set to k=t3. Further, if the separation patterns of the tracks of FIG. 5 are same as each other for further simplification, then the data vector can be represented as given by the following expression (7):

[expression (7)]

$$\begin{bmatrix} x1(t1) & x1(t2) & x1(t3) \\ x2(t1) & x2(t2) & x2(t3) \\ x3(t1) & x3(t2) & x3(t3) \end{bmatrix} = \begin{bmatrix} 1 & 0 & 0 \\ 0 & 1 & 0 \\ 0 & 0 & 1 \end{bmatrix} \quad (7)$$

Within the T1 interval, since the data vector recorded at k=t1 is [1, 0, 0],

[expression (8)]

$$\begin{bmatrix} y1(t1) \\ y2(t1) \\ y3(t1) \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} 1 \\ 0 \\ 0 \end{bmatrix} \quad (8)$$

Within the T2 interval, since the data vector recorded at k=t2 is [0, 1, 0],

[expression (9)]

$$\begin{bmatrix} y1(t2) \\ y2(t2) \\ y3(t2) \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} 0 \\ 1 \\ 0 \end{bmatrix} \quad (9)$$

Within the T3 interval, since the data vector recorded at k=t3 is [0, 0, 1],

[expression (10)]

$$\begin{bmatrix} y1(t3) \\ y2(t3) \\ y3(t3) \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} 0 \\ 0 \\ 1 \end{bmatrix} \quad (10)$$

From the expressions (8), (9) and (10), the matrix H can be represented, depending upon the reproduction signals at k=t1, k=t2 and k=t3, as given by the following expression (11)

[expression (11)]

$$H = \begin{bmatrix} h_{11} & h_{12} & h_{13} \\ h_{21} & h_{22} & h_{23} \\ h_{31} & h_{32} & h_{33} \end{bmatrix} = \begin{bmatrix} y1(t1) & y1(t2) & y1(t3) \\ y2(t1) & y2(t2) & y2(t3) \\ y3(t1) & y3(t2) & y3(t3) \end{bmatrix} \quad (11)$$

The matrix H is determined in such a manner as described above as the channel estimation information.

While here the matrix H of the expression (5) is calculated based on the arrangement of FIG. 5 and a generalized inverse matrix to the matrix H is determined and then arithmetic operation of the expression (4) is performed, also where the matrix H of the expression (6) is used based on the arrangement of FIG. 6, a generalized inverse matrix to the matrix H may be determined in a similar manner, whereafter the arithmetic operation of the expression (4) is performed.

It is to be noted that, in the examples of FIGS. 5 and 6, the number of types of the separation patterns correspond to the track number. This is because it is intended to make it possible to determine a generalized matrix to the matrix H after the matrix H is calculated. For example, separation patterns given by the expression (12) below are available as separation patterns other than those of the expression (7). Only it is necessary for the separation patterns to include three patterns primarily independent of each other.

[expression (12)]

$$\begin{bmatrix} x1(t1) & x1(t2) & x1(t3) \\ x2(t1) & x2(t2) & x2(t3) \\ x3(t1) & x3(t2) & x3(t3) \end{bmatrix} = \begin{bmatrix} 1 & 0 & 1 \\ 1 & 1 & 0 \\ 0 & 1 & 1 \end{bmatrix} \quad (12)$$

Incidentally, according to the method of the signal separation arithmetic operation given above, a generalized inverse matrix to the matrix of the expression (11) is determined, and then arithmetic operation of the expression (4) is performed. The method which uses the expression (4) is generally called zero forcing method. It is to be noted that the signal separation arithmetic operation is not limited to the method which uses the expression (4), but, for example, an MMSE (Minimum Mean Squared Error) method may be used in place of a generalized inverse matrix to a matrix. In this instance, the expression (4) is represented by the following expression (13):

[expression (13)]

$$X(k) = \frac{H^T}{|H|^2 + \frac{1}{\gamma}} Y(k) \quad (13)$$

where γ represents the power ratio (Signal to Noise Ratio, SN ratio) between the signal component and the noise component.

In the modified magnetic recording and reproduction apparatus having the configuration described above, by collecting signals reproduced each across a plurality of tracks by the reproduction heads in a unit and performing a predetermined signal process for the unit, reproduction signals of the individual tracks can be separated from each other. Therefore, the distance between the tracks in the unit can be set smaller than the width of the reproduction heads, and consequently, a higher track density can be achieved.

Incidentally, where the track number is three and the reproduction head number is three as in the arrangement of FIG. 5 and a guard 42 is provided between units 41 as seen in FIG. 4, the reproduction head 211 extends across a guard 42, the track (1) and the track (2); the reproduction head 212 extends across the three tracks (1), (2) and (3); and the reproduction head 213 extends across the track (2), the track (3) and another guard 42.

Accordingly, among the signals of the tracks obtained by the signal separation process, the signal of the track (1) is produced from the signal from the reproduction head 211 and the signal from the reproduction head 212. The signal of the track (2) is produced from the signals from the reproduction heads 211, 212 and 213. The signal of the track (3) is produced from the signal from the reproduction head 212 and the signal from the reproduction head 213.

Here, if attention is paid to the signal of, for example, the track 212, the signal of the track (2) is produced from three reproduction signals reproduced from three different places whose track positions are displaced from each other. Accordingly, when compared with an alternative case wherein one track is reproduced once by one reproduction head as in the existing magnetic recording and reproduction apparatus, the amount of the positional displacement of each reproduction head with respect to a track with which good signal reproduction is assured can be increased.

On the other hand, where the track number is three and the reproduction head number is four as seen in FIG. 6, the reproduction head 211 extends across a guard 42, the track (1) and the track (2); the reproduction head 212 extends across the track (1), track (2) and track (3); the reproduction head 213 extends across the track (1), track (2) and track (3); and the reproduction head 214 extends across the track (2), the track (3) and another guard 42.

In this instance, among the signals of the tracks obtained by the signal separation process, the signal of the track (1) is produced from the signals from the reproduction heads 211 and 212. The signal of the track (2) is produced from the signals from the reproduction heads 211, 212, 213 and 214. The signal of the track (3) is produced from the signals from the reproduction heads 213 and 214.

Accordingly, for example, with regard to the track (2), one track (2) signal can be extracted using the four reproduction signals reproduced from four different places whose track positions are displaced from each other. Accordingly, when compared with an alternative case wherein one track is reproduced once by one reproduction head as in the existing magnetic recording and reproduction apparatus, the amount of the positional displacement of each reproduction head with respect to a track with which good signal reproduction is assured can be increased.

Second Embodiment

Now, a magnetic recording and reproduction apparatus according to a second embodiment of the present invention which uses a single head is described with reference to FIGS. 7 to 9.

Figure 7:
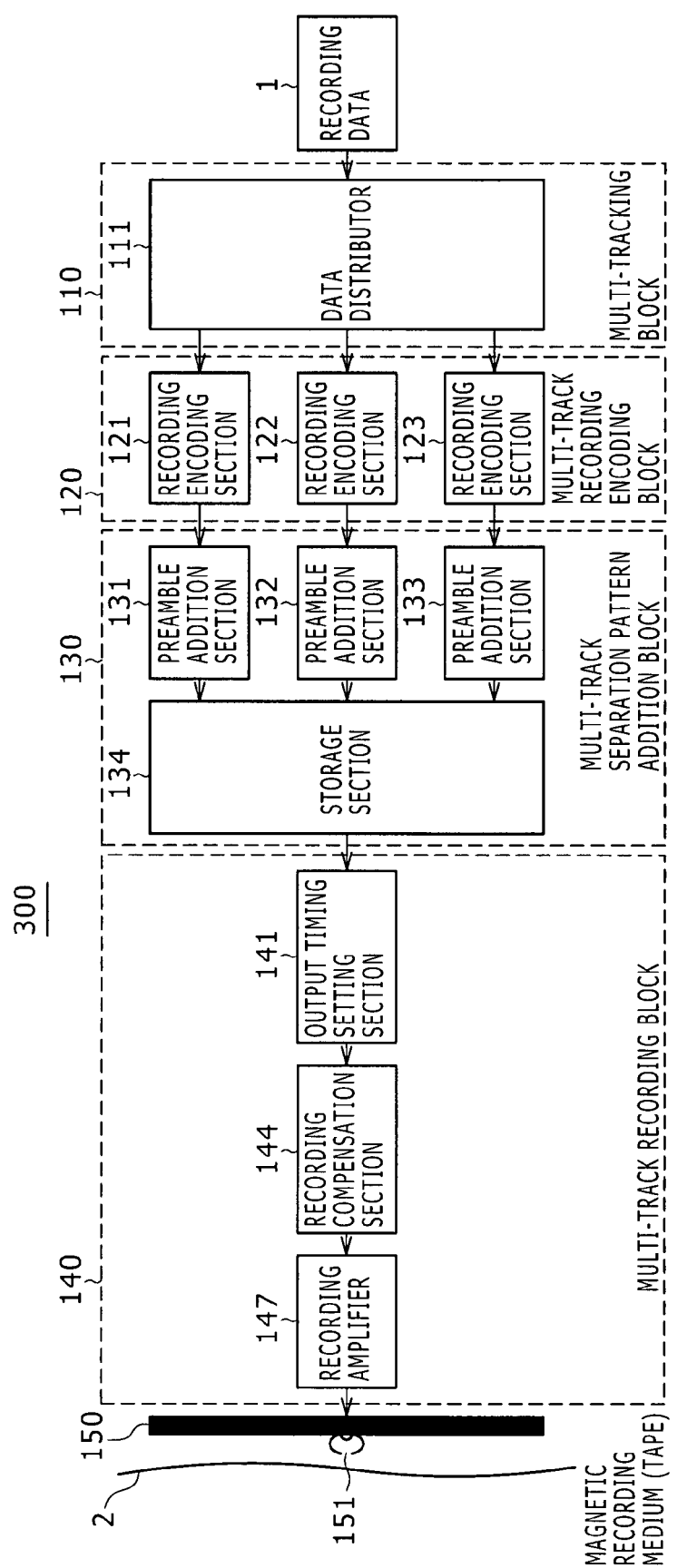
FIG. 7 is a block diagram showing a configuration of a recoding apparatus, in which a single head is used, of a recording and reproduction apparatus according to a second embodiment of the present invention.

FIG. 7 shows a configuration of the recording apparatus 300 of the present embodiment which uses a single head.

Referring to FIG. 7, the recording apparatus 300 includes a multi-tracking block 110, a multi-track recording encoding block 120, a multi-track separation pattern addition block 130, a multi-track recording block 140, and a recording head array 150 similarly as in the recording apparatus 100 described hereinabove with reference to FIG. 1. However, the recording apparatus 300 is different from the recording apparatus 100 in that the recording head array 150 includes a single recording head 151 and, corresponding to this, the multi-track recording block 140 includes a single recording amplifier 147, a single recording compensation section 144 and a single output timing setting section 141. Further, the multi-track separation pattern addition block 130 additionally includes a storage section 134 interposed between the plural preamble addition sections 131, 132 and 133 thereof and the output timing setting section 141 for storing recording data at least for one unit. In particular, the storage section 134 stores recording code strings including separation patterns for individual tracks which form the unit.

Figure 23:
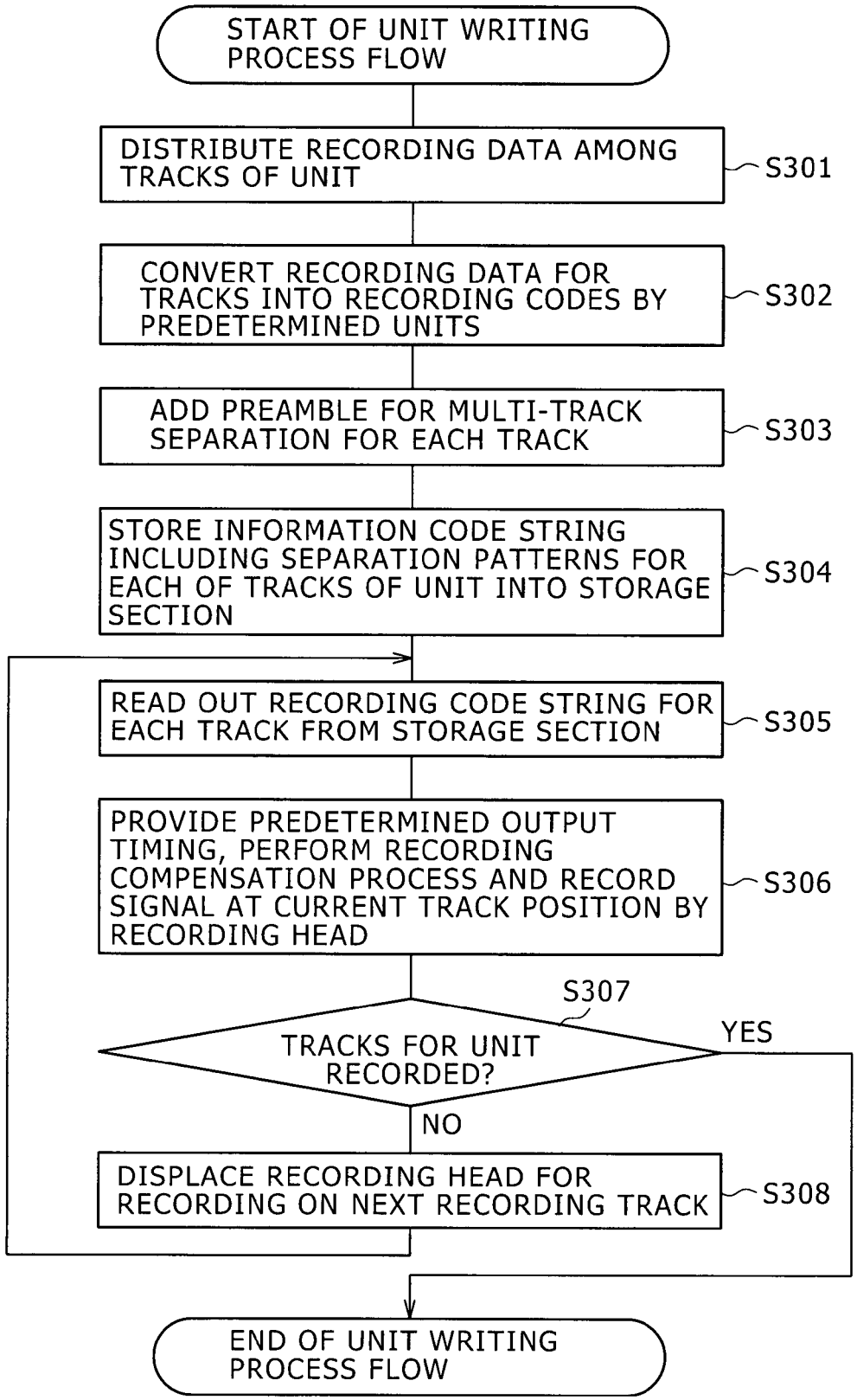
FIG. 23 is a flow chart illustrating recording action of the recording apparatus of FIG. 7.

FIG. 23 illustrates recording action of the recording apparatus 300.

Referring to FIG. 23, in the recording apparatus 300, recording data 1 inputted thereto are distributed into data for individual tracks by the multi-tracking block 110 (step S301). Then, the distributed data are encoded into codeword strings taking the recording and reproduction characteristics of the magnetic recording medium 2 into consideration by the recording encoding sections 121, 122 and 123 of the multi-track recording encoding block 120. At this time, also information necessary for data demodulation such as a synchronizing signal pattern is added to the codeword strings (step S302). Thereafter, preamble codes are added to predetermined positions of the thus produced codeword strings of the individual tracks by the preamble addition sections 131, 132 and 133 of the multi-track separation pattern addition block 130 to form recording code strings (step S303). The recording code strings of the individual tracks produced in this manner are stored into the storage section 134 (step S304).

Then, the recording code string of the track to be recorded first is read out from the storage section 134 (step S305). The recording code string of the track is provided with a desired timing by the output timing setting section 141 and is then subject to a recording compensation process for the optimization for recording on the magnetic recording medium 2. Thereafter, the recording code string is converted from a voltage into current by the recording amplifier 147 and sent as such to the recording head 151 so that it is recorded on the magnetic recording medium 2 by the recording head 151 (step S306).

After the recording of one track comes to an end, it is decided whether or not the recording of tracks for one unit is completed (step S307). If the recording is not completed as yet (No at step S307), then the recording head 151 is shifted to the next position (step S308). Thereafter, the recording code string of the next track is read out from the storage section 134 and the processes for recording of the read out recording code string are repeated similarly. The action described above is repeated until recording of the tracks for the one unit is completed.

The recording head 151 first performs recording of the first track at the position P1, and then is shifted to the position P2 and performs recording of the next track at the position P2. Thereafter, the recording head 151 is shifted to the position P3 and performs recording of the further next track at the position P3.

Figure 8:
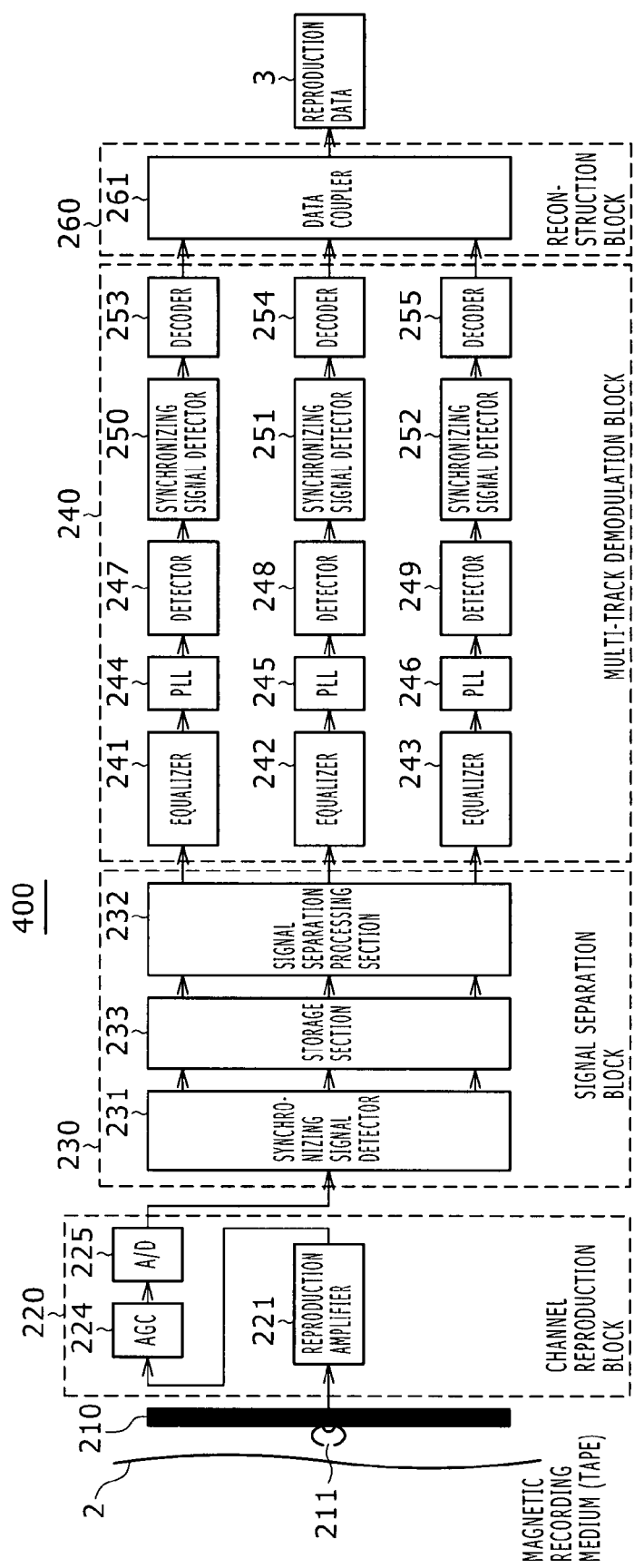
FIG. 8 is a block diagram showing a configuration of a reproduction apparatus, in which a single head is used, of the recording and reproduction apparatus of the second embodiment.
Figure 9:
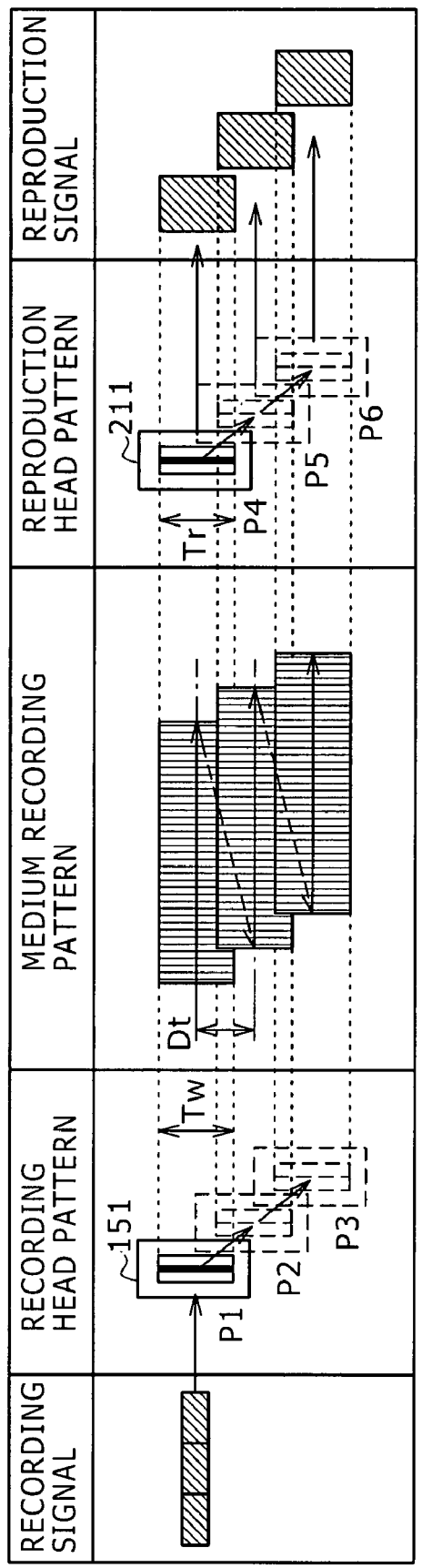
FIG. 9 is a view illustrating a recording head pattern, a medium recording pattern and a reproduction head pattern where a single head is used.

FIG. 8 shows a configuration of a reproduction apparatus of the magnetic recording and reproduction apparatus of the present embodiment which uses a single head. Referring to FIG. 8, the reproduction apparatus 400 shown includes a reproduction head array 210, a channel reproduction block 220, a signal separation block 230, a multi-track demodulation block 240 and a reconstruction block 260 similarly as in the reproduction apparatus 200 described hereinabove with reference to FIG. 2. However, the reproduction apparatus 400 is different from the reproduction apparatus 200 in that the reproduction head array 210 includes a single reproduction head 211 and, corresponding to this, the channel reproduction block 220 includes a single reproduction head 221, a single AGC 224 and a single A/D converter 225. Further, the reproduction apparatus 400 is different from the reproduction apparatus 200 in that the signal separation block 230 additionally includes a storage section 233 interposed between the synchronizing signal detector 231 and the signal separation processing section 232 for storing reproduction signals at least for one unit. The reproduction head 211 first performs reproduction of signals from a plurality of tracks at a first position (for example, at a position P4 of FIG. 9) of a unit. Then, the reproduction head 211 is shifted to another position P5 of FIG. 9 and performs reproduction of signals from a plurality of tracks at the position P5. Thereafter, the reproduction head 211 is shifted to a further position P6 of FIG. 9 and performs reproduction of signals from a plurality of tracks at the position P6. It is to be noted that tracing of the recording tracks upon reproduction by the single head is repeated by a number of times at least equal to the number of recording tracks of one unit. In other words, such tracing may be repeated by a number of times greater than the number of recording tracks. Thereupon, all recording tracks of one unit are traced at least once. Into the storage section 233, signals for one unit reproduced at different shifted positions by the reproduction head 211 are stored. In particular, the signals reproduced from the plural tracks at the individual positions by the reproduction head 211, that is, necessary reproduction signals later than the separation patterns detected by the synchronizing signal detector 231, are stored into the storage section 233.

Figure 24:
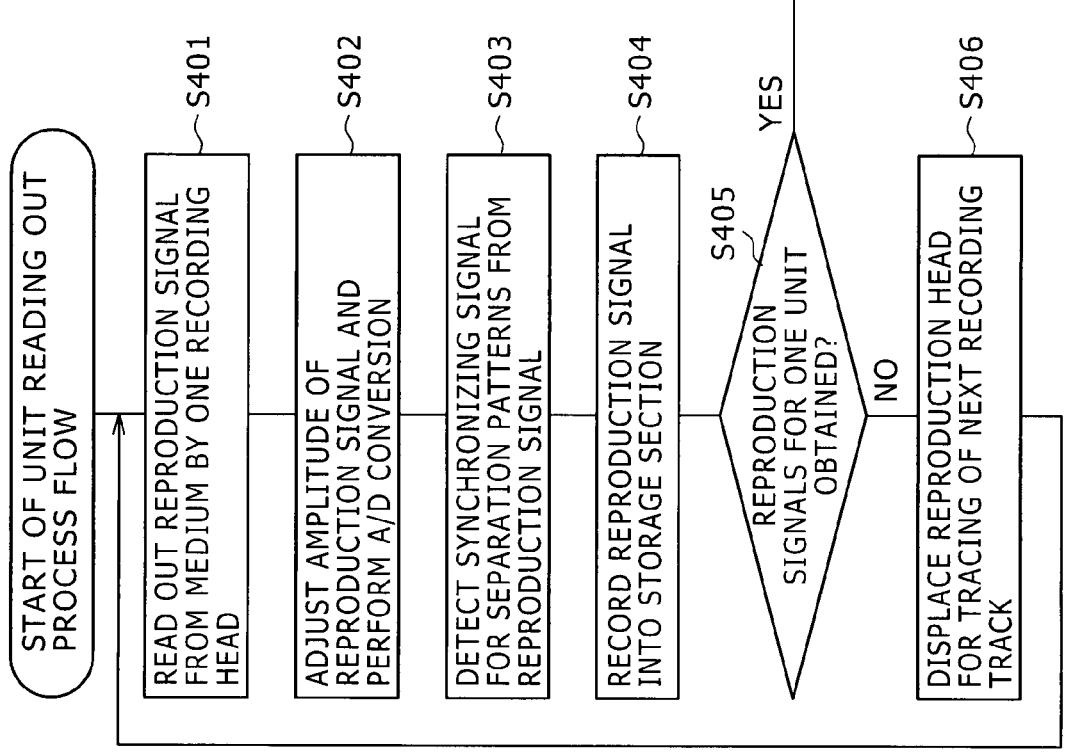
FIG. 24 is a flow chart illustrating reproduction action of the reproduction apparatus of FIG. 8.

FIG. 24 illustrates reproduction action of the reproduction apparatus 400.

Referring to FIG. 24, in the reproduction apparatus 400, a signal is reproduced from a plurality of tracks at a first position by the reproduction head 211 (step S401). Then, the amplification level of the output of the reproduction head 221 is adjusted by the AGC 224, and then the output of the AGC 224 is converted into a digital value by the A/D converter 225 and outputted to the synchronizing signal detector 231 (step S402). The synchronizing signal detector 231 performs detection of a synchronizing signal for detecting the start position of the separation patterns outputted from the A/D converter 225 (step S403). Thereafter, the reproduction signals of the tracks are stored into the storage section 233 (step S404). Then, the reproduction head 211 is shifted to a next position (step S406) and reproduction signals from the tracks are stored into the storage section 233 through similar processes to those described hereinabove.

It is to be noted that a low-pass filter for removing unnecessary high frequency components may be provided immediately preceding to the A/D converter as occasion demands. Further, the AGC may otherwise be disposed next to the A/D converter so that the gain is controlled after quantization.

After the reproduction signals for one unit are stored into the storage section 233 (YES at step S405), the signal separation processing section 232 reads out the reproduction signals for one unit stored in the storage section 233 and performs channel estimation arithmetic operation using the separation patterns whose start position is specified based on the synchronizing signal (step S407). Then, the signal separation processing section 232 reads out a plurality of reproduction signals necessary to produce a reproduction signal for each of the recording tracks (step S408). Then, the signal separation processing section 232 produces reproduction signals of the individual recording tracks from the read out reproduction signals and a result of the channel estimation arithmetic operation (step S409). Then, similarly as in the reproduction apparatus 200 described hereinabove with reference to FIG. 2, the reproduction signals of the tracks are demodulated individually by the multi-track demodulation block 240 (step S410). The reproduction data of the tracks for one unit produced in such a manner as described above are connected to each other by the reconstruction block 260 to restore original recording data (step S411).

Third Embodiment

The present invention can be applied not only to magnetic recording and reproduction of the non-azimuth type but also to magnetic recording and reproduction of the double azimuth system wherein a plurality of azimuth directions are used similarly.

Figure 10:
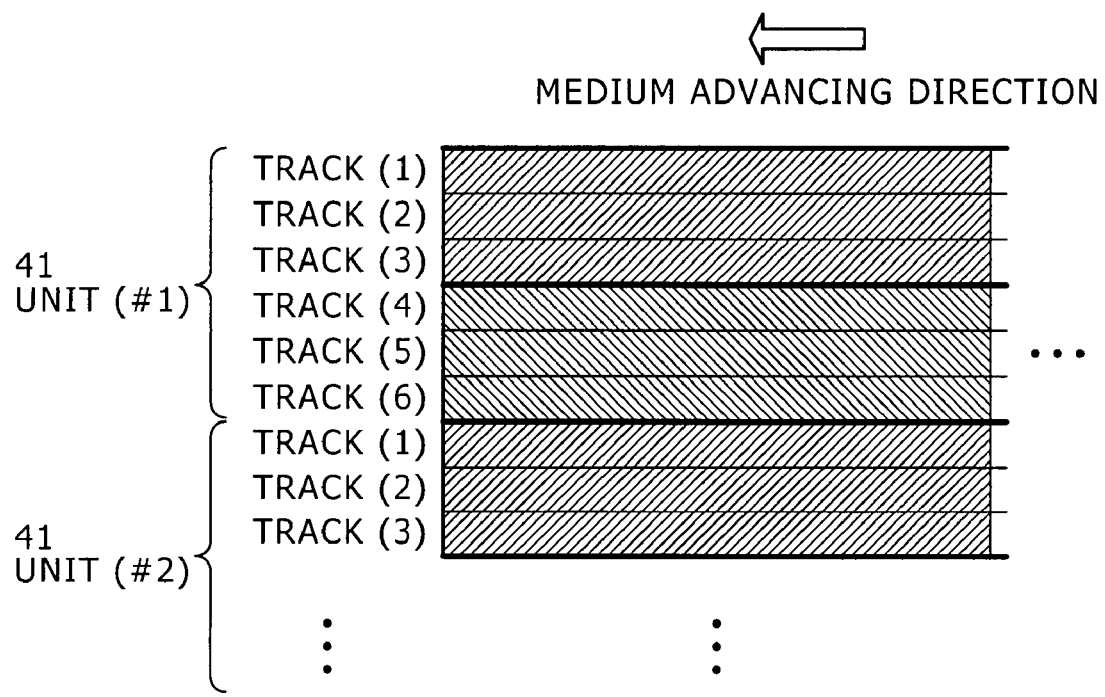
FIG. 10 is a diagrammatic view illustrating a concept of tracks recorded on a magnetic recording medium by a double azimuth system.
Figure 11:
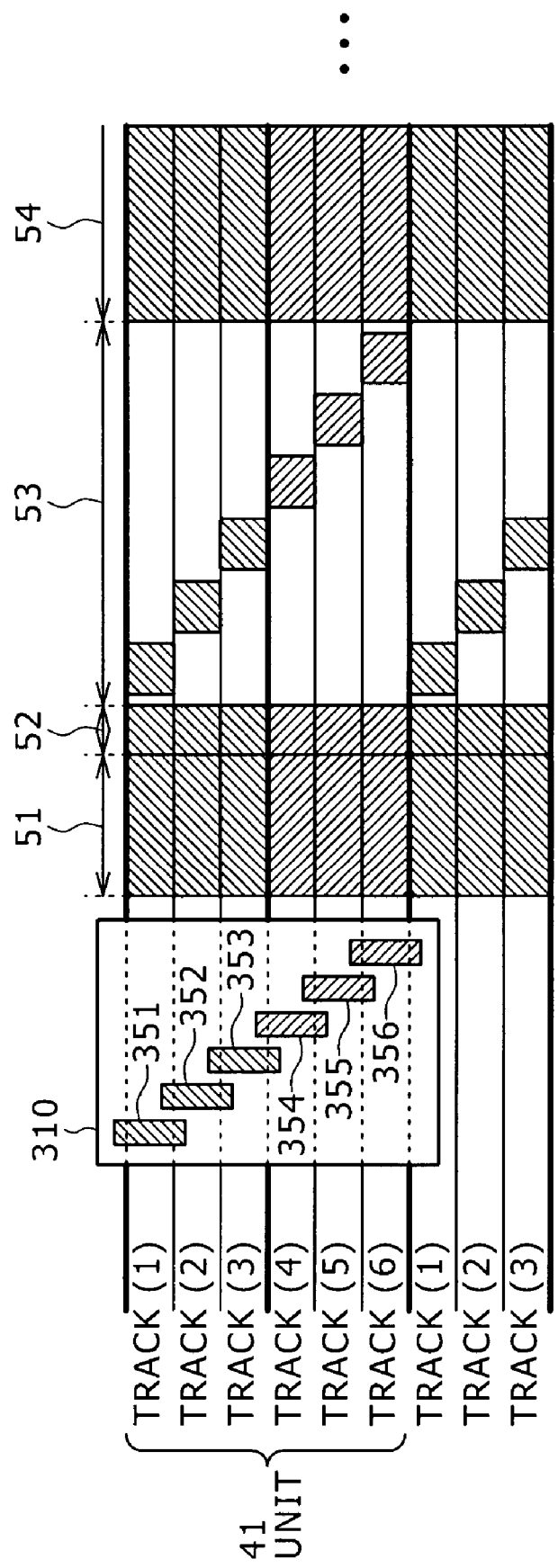
FIG. 11 is a diagrammatic view illustrating an example of separation patterns recorded on the tracks shown in FIG. 10.

FIG. 10 illustrates a concept of a unit of tracks recorded on a magnetic recording medium using a double azimuth system, and FIG. 11 illustrates an example of separation patterns in the case of recording of FIG. 10.

In the magnetic recording and reproduction apparatus of the present embodiment, six heads are used for each of recording and reproduction. While FIG. 11 shows the reproduction heads, also the recording heads are provided similarly. From among the six reproduction heads 211, 212, 213, 214, 215 and 216, the group of the three successive reproduction heads 211, 212 and 213 and the group of the three successive reproduction heads 214, 215 and 216 have magnetization directions of tracks, that is, azimuth directions, different from each other. In other words, the tracks (1) to (3) and the tracks (4) to (6) have different azimuth directions from each other. The six tracks (1) to (6) make a unit 41 as one processing unit. It is to be noted that, in the present double azimuth system, no guard band is provided.

For recording of preambles, such different six separation patterns as seen in FIG. 11 are provided.

It is to be noted that, while, in the example of FIGS. 10 and 11, channel estimation arithmetic operation and signal separation arithmetic operation are performed for a group of the tracks (1) to (6) separated as one processing unit to separate reproduction signals of individual tracks from each other, each three successive tracks which have the same azimuth direction (for example, the tracks (1) to (3) or the tracks (4) to (6)) may be adopted as one processing unit.

Upon recording of the preambles in this instance, for example, the three different separation patterns (second preamble 53) used in the magnetic recording and reproduction apparatus of the first embodiment described hereinabove with reference to FIG. 5 can be used for the three tracks #1 (1) to (3), tracks #1 (4) to (6) and tracks #2 (1) to (3) shown in FIG. 10.

Figure 12:
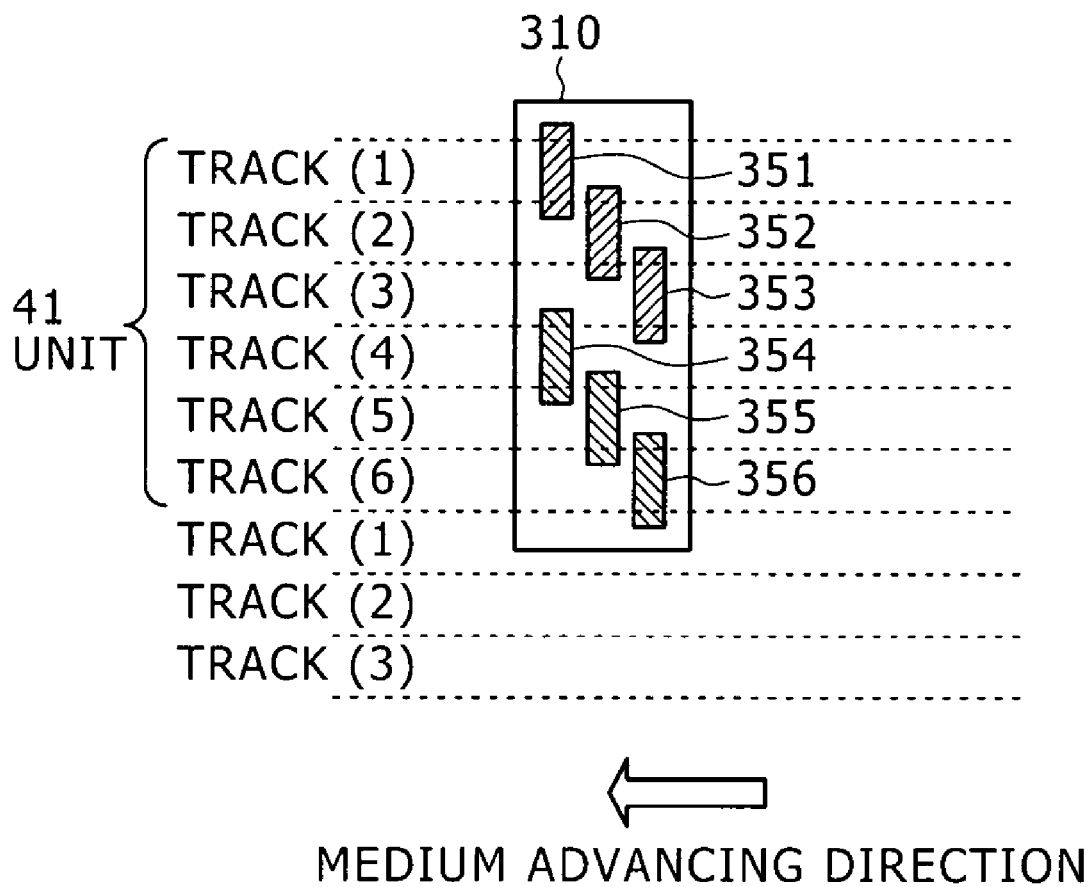
FIG. 12 is a diagrammatic view showing an example of arrangement of reproduction heads of a magnetic recording and reproduction system of a double azimuth system.

It is to be noted that it is necessary to determine the arrangement of a plurality of recording heads taking it into consideration that, upon recording, a succeeding recording head overwrites a signal recorded by a preceding head (FIG. 11). In contrast, no such consideration may be required for reproduction heads, and therefore, the arrangement of reproduction heads can be determined with a higher degree of freedom. For example, the arrangement of reproduction heads may be such as that shown in FIG. 11 or that shown in FIG. 12.

Fourth Embodiment

While a magnetic recording and reproduction system of a linear recording system is described above, the present invention can be applied also to a helical scanning system similarly.

Figure 13:
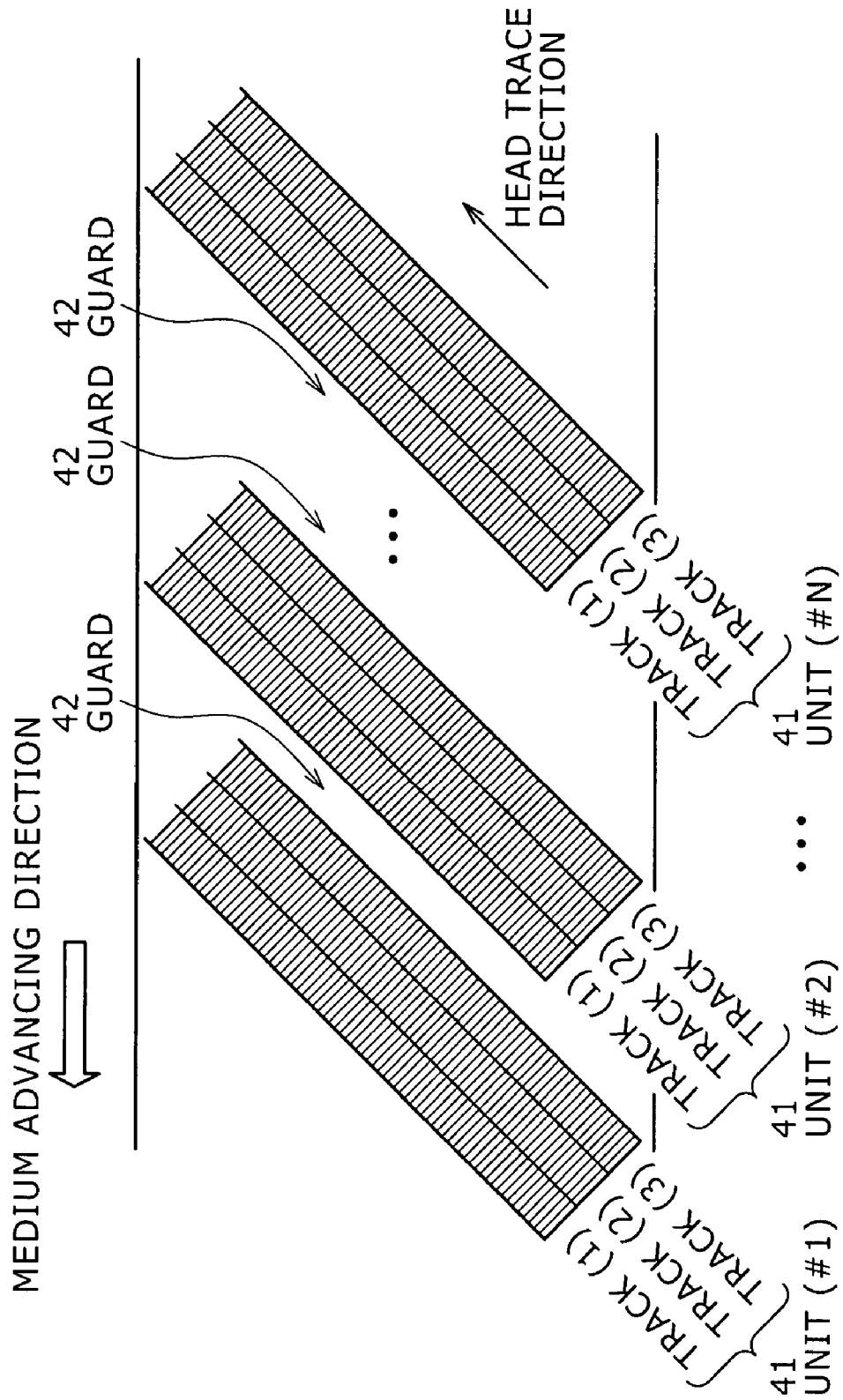
FIG. 13 is a diagrammatic view illustrating a concept of one unit of tracks recorded on a magnetic recording medium by a helical scanning system using a plurality of recording heads.
Figure 14:
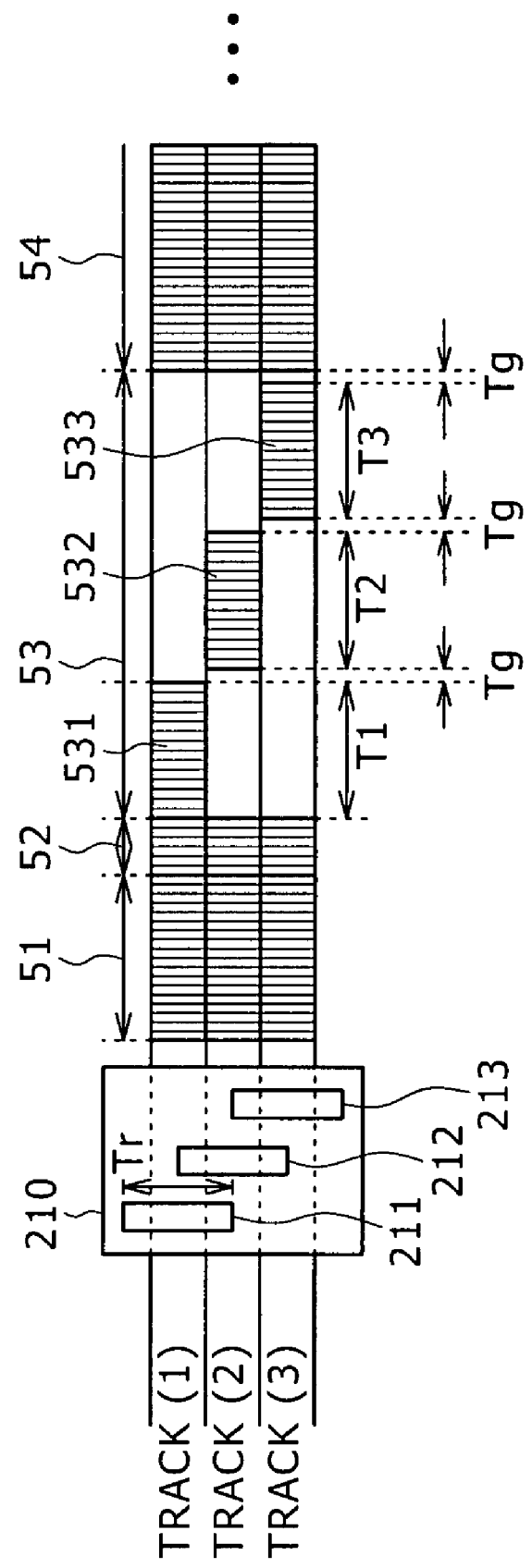
FIG. 14 is a diagrammatic view showing an example of separation patterns recorded on the tracks shown in FIG. 13.

FIG. 13 illustrates a concept of one unit of tracks recorded on a magnetic recording medium by a helical scanning system using a plurality of recording heads. Also in the helical scanning system, a guard 42 is disposed between units 41. The separation patterns to be recorded on tracks (1) to (3) may be same as the patterns (FIG. 5) applied in the linear recording method as seen in FIG. 14.

Figure 15:
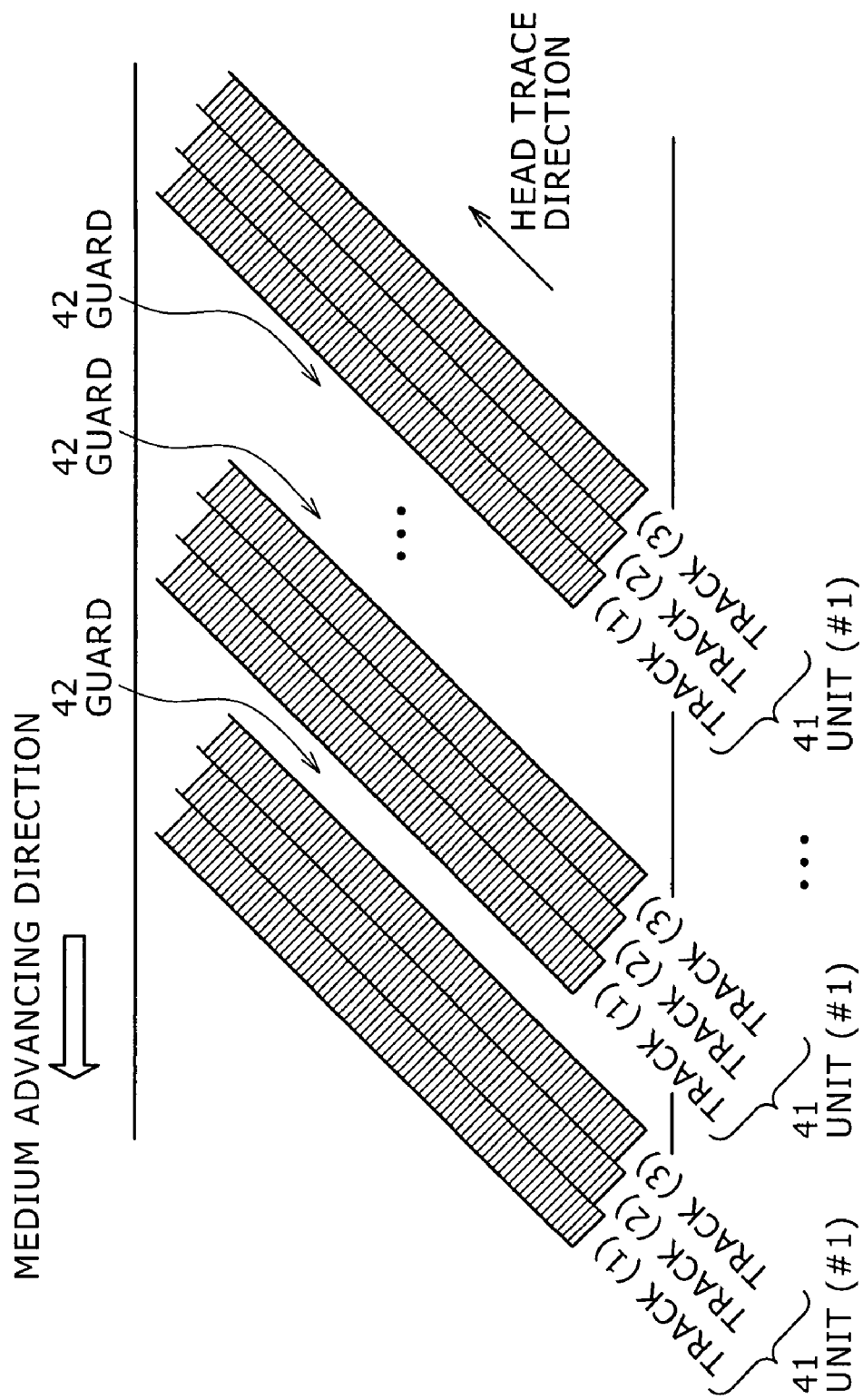
FIG. 15 is a diagrammatic view illustrating a concept of another one unit of tracks recorded on a magnetic recording medium by a helical scanning system using a plurality of recording heads.

FIG. 15 illustrates a concept of one unit of tracks recorded on a magnetic recording medium by a helical scanning system using one recording head. The recording in this instance is performed similarly to recording performed using a plurality of recording heads illustrated as described above with reference to FIG. 13 except that it is performed at each position to which the recording head is shifted. The separation patterns to be recorded on tracks (1) to (3) may be same as the patterns (FIG. 5) applied in the linear recording method as seen in FIG. 16.

Figure 16:
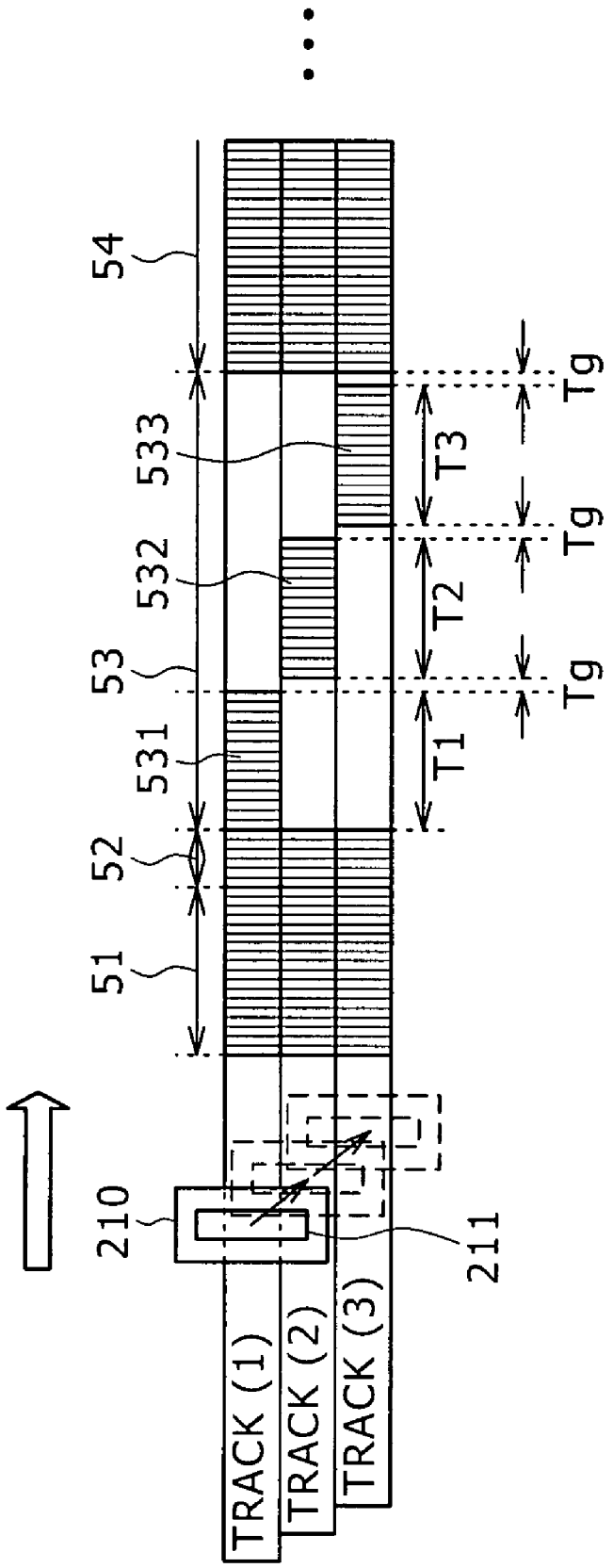
FIG. 16 is a diagrammatic view showing an example of separation patterns recorded on the tracks shown in FIG. 15.

It is to be noted that, also where the position at which recording of a track is to be started is displaced, the start position of the separation patterns is adjusted as seen in FIGS. 15 and 16.

Figure 17:
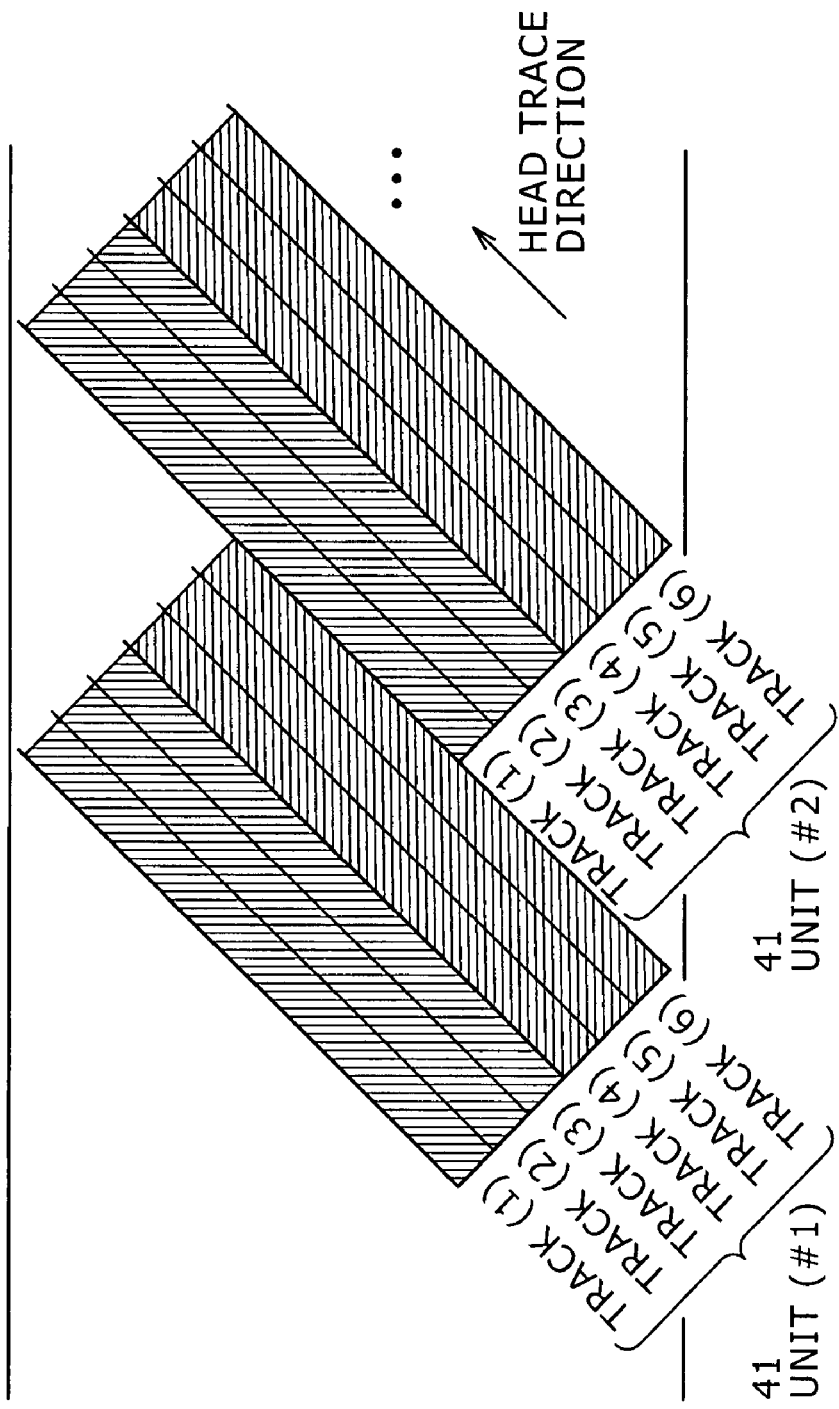
FIG. 17 is a diagrammatic view illustrating one unit of tracks recorded on a magnetic recording medium by a double azimuth helical scanning system using a plurality of recording heads.
Figure 18:
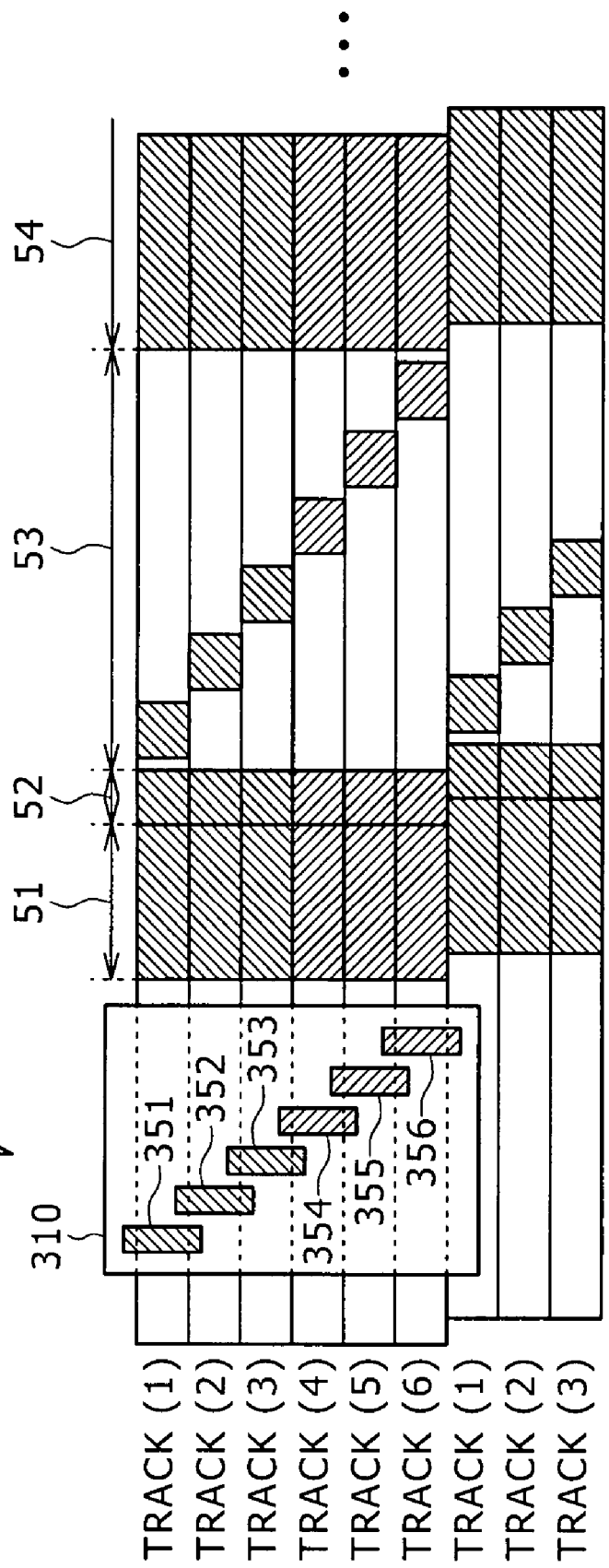
FIG. 18 is a diagrammatic view showing an example of separation patterns recorded on the tracks shown in FIG. 17.

FIG. 17 illustrates a concept of one unit of tracks recorded on a magnetic recording medium by a double azimuth helical scanning system using a plurality of recording heads. FIG. 18 shows an example of separation patterns recorded on tracks (1) to (6) by the double azimuth helical scanning system. The present invention can be applied similarly also to a double azimuth helical scanning system wherein such a plurality of recording heads as just described are used.

Figure 19:
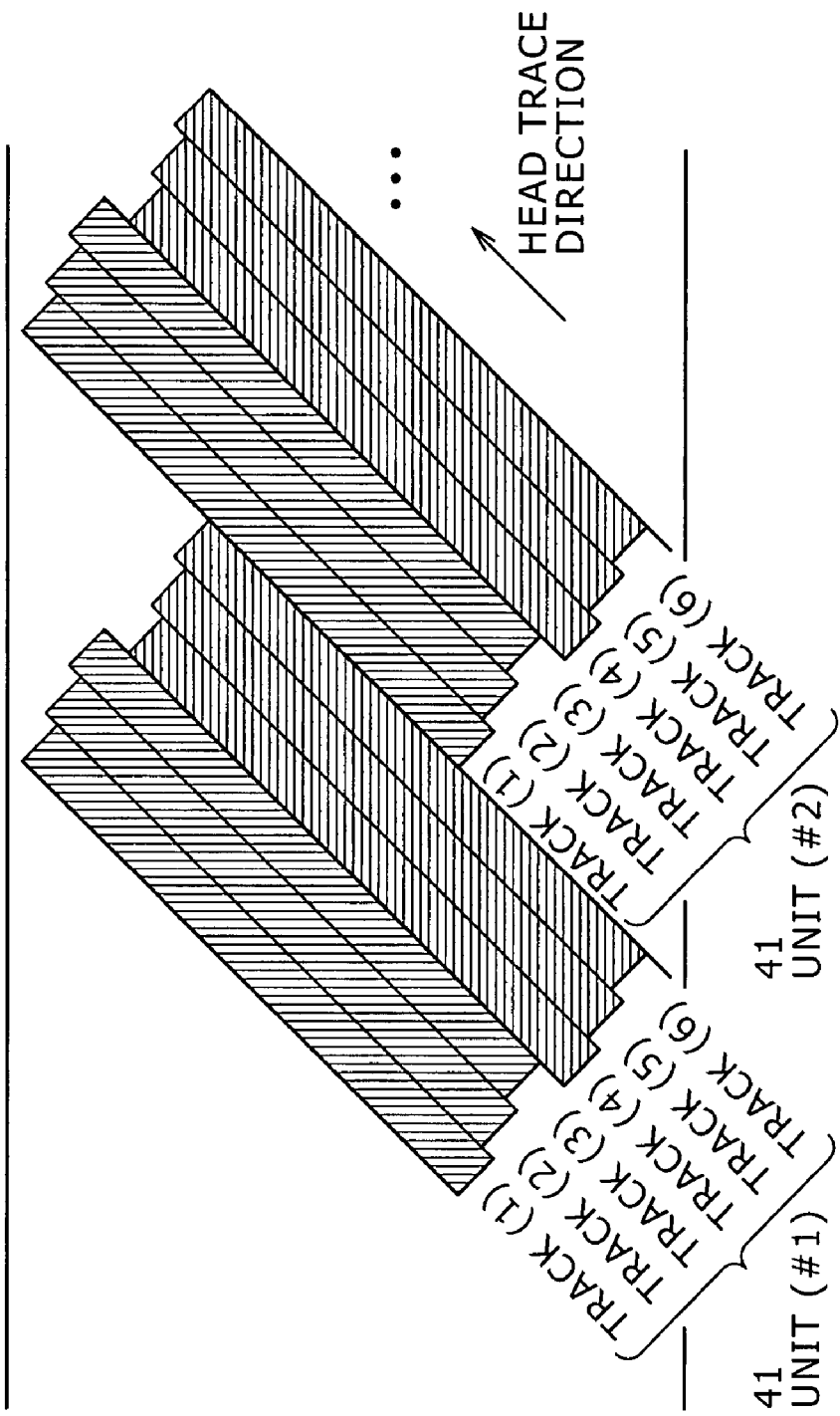
FIG. 19 is a diagrammatic view illustrating one unit of tracks recorded on a magnetic recording medium by a double azimuth helical scanning system using recording heads for individual azimuth angles.
Figure 20:
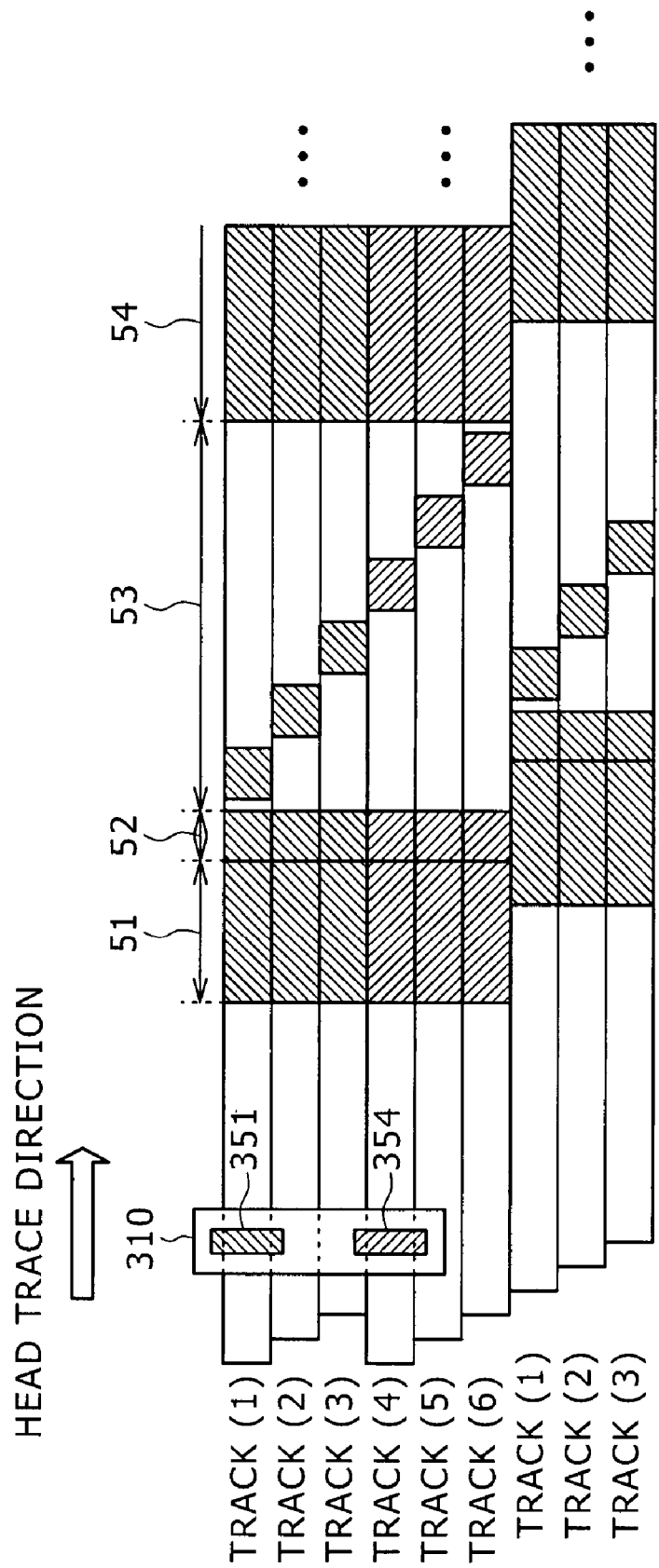
FIG. 20 is a diagrammatic view showing an example of separation patterns recorded on the tracks shown in FIG. 19.

FIG. 19 illustrates a concept of one unit of tracks recorded on a magnetic recording medium by a double azimuth helical scanning system using one recording head for each azimuth angle. FIG. 20 shows an example of separation patterns recorded on a magnetic recording medium by the double azimuth helical scanning system. The present invention can be applied similarly also to such a double azimuth helical scanning system as just described.

In all systems, the separation patterns to be recorded on individual tracks may be similar to those in the case of the linear recording system as seen in FIGS. 18 and 20.

It is to be noted that, as seen in FIGS. 19 and 20, also where the position at which recording of a track is to be started is displaced, the start position of the separation patterns is adjusted.

While preferred embodiments of the present invention have been described using specific terms, such description is for illustrative purposes only, and it is to be understood that changes and variations may be made without departing from the spirit or scope of the following claims.

What is claimed is:

1. A magnetic recording and reproduction method, comprising:

recording a plurality of tracks which make a unit for data detection by means of a recording head on a magnetic recording medium;

reproducing signals of the plural tracks a plural number of times in different positional relationships to the tracks by means of a reproduction head which can reproduce a signal across the plural tracks of the magnetic recording medium, collecting the reproduction signals in the unit and reproducing signals for the individual tracks; and wherein during reproduction of signals from the plural tracks, channel estimation information corresponding to position information of the reproduction head with respect to the plural tracks is determined and the reproduction signals for the individual tracks are determined based on the channel estimation information and signals reproduced at different positional relationships from the plural tracks.

2. The magnetic recording and reproduction method according to claim 1, wherein, at the reproduction step, tracking servo information is used to determine the channel estimation information.

3. The magnetic recording and reproduction method according to claim 1, wherein, at the recording step, a signal of a recording wavelength equal to or greater than a minimum recording wavelength is recorded as separation patterns at unique positions of the individual tracks so that the position information of the reproduction head with respect to the plural tracks can be produced at the reproduction step, and
at the reproduction step, the channel estimation information is determined by the signal process based on the reproduction signals of the separation patterns.

4. The magnetic recording and reproduction method according to claim 3, wherein, at the reproduction step, the reproduction signals of the separation patterns are used to calculate a matrix as a channel estimation function and a generalized inverse matrix to the matrix is determined, and then the reproduction signals of the individual tracks are produced from the generalized inverse matrix and a plurality of signals read out by the reproduction head.

5. The magnetic recording and reproduction method according to claim 3, wherein, at the reproduction step, the reproduction signals of the separation patterns are used to calculate a matrix as a channel estimation function and a minimum mean squared error method is applied to the matrix to produce the reproduction signals of the individual tracks.

6. The magnetic recording and reproduction method according to claim 3, wherein, at the recording step, a learning signal pattern for automatic gain adjustment and/or bit synchronism detection is recorded at a position preceding to the separation patterns.

7. The magnetic recording and reproduction method according to claim 3, wherein, at the recording step, a synchronizing signal pattern to be used for detection of the position of the separation patterns is recorded at a position preceding to the separation patterns.

8. The magnetic recording and reproduction method according to claim 1, wherein, at the recording step, where a plurality of units each including a plurality of tracks which make a unit of a signal process for data detection are recorded on the magnetic recording medium, a guard area in which recording is inhibited is disposed between adjacent ones of the units.

9. The magnetic recording and reproduction method according to claim 1, wherein,
at the recording step, the single recording head is shifted to record the plural tracks, and
at the reproduction step, the single reproduction head is shifted to produce a plurality of reproduction signals from the plural tracks.

10. The magnetic recording and reproduction method according to claim 1, wherein,
at the recording step; a plurality of recording head elements of the recording head are used to record the plural tracks, and
at the reproduction step, a plurality of reproduction head elements of the recording head are used to produce a plurality of reproduction signals from the plural tracks.

11. The magnetic recording and reproduction method according to claim 10, wherein
the width of the plural recording head elements is set such that the width of those ones of the plural tracks which are positioned at the opposite ends is greater than the width of the other track or tracks while the width of the reproduction head elements is set smaller than the width of the tracks at the opposite ends, and
at the recording step, where a plurality of units each including the plural tracks are to be recorded, the units are recorded without a gap left between each other.

12. The magnetic recording and reproduction method according to claim 10, wherein
the widths of the plural recording head elements are set equal to each other while
the width of the reproduction head elements at the opposite ends of the plural reproduction heads is set smaller than the width of the other reproduction head or heads, and
at the recording step, where a plurality of units each including the plural tracks are to be recorded, the units are recorded without a gap left between each other.

13. The magnetic recording and reproduction method according to claim 1, wherein the plural tracks have a same azimuth direction.

14. The magnetic recording and reproduction method according to claim 1, wherein the plural tracks have a plurality of azimuth directions.

15. A recording apparatus, comprising:
a data distributor configured to distribute recording data to data for a plurality of tracks;
a recording encoding section configured to encode the recording data for the plural tracks distributed by said data distributor;
a preamble addition section configured to add a signal having a recording wavelength equal to or higher than a minimum recording wavelength as separation patterns to positions of the encoded recording data for the plural tracks which are unique to the individual tracks to produce recording code strings;
a multi-track recording block configured to record the recording code strings for the individual tracks on a magnetic recording medium using a magnetic head; and
a reproduction section for reproducing signals from the plural tracks wherein channel estimation information corresponding to position information of a reproduction head with respect to the plural tracks is determined and the reproduction signals for the individual tracks are determined based on the channel estimation information and signals reproduced at different positional relationships from the plural tracks.

16. The recording apparatus according to claim 15, wherein said magnetic head includes a plurality of recording head elements provided for the individual tracks and disposed in a displaced relationship from each other as viewed in a direction perpendicular to a traveling direction of the magnetic recording medium.

17. A reproduction apparatus for reproducing signals from a magnetic recording medium on which a plurality of tracks which make a unit for data detection are recorded, comprising:
a reproduction section including a reproduction head capable of reproducing a signal across a plurality of tracks of the magnetic recording medium to reproduce a plurality of signals from the plural tracks in different positional relationships with respect to the plural tracks; and a signal separation section configured to collect the plural signals reproduced by said reproduction section in the unit and generate reproduction signals for the individual tracks; and wherein said signal separation section determines channel estimation information corresponding to position information of said reproduction head with respect to the plural tracks and determines the reproduction signals for the individual tracks based on the channel estimation information and signals reproduced in the different positional relationship with respect to the plural tracks.

18. The reproduction apparatus according to claim 17, wherein said signal separation section determines the channel estimation information based on the reproduction signals of separation patterns recorded as a signal of a recording wavelength equal to or greater than a minimum recording wavelength at unique positions of the individual tracks of the magnetic recording medium.

19. The reproduction apparatus according to claim 17, wherein said signal separation section uses tracking servo information to determine the channel estimation information.

20. The reproduction apparatus according to claim 17, wherein said signal separation section calculates a matrix as a channel estimation function using the reproduction signals of the separation patterns and determines a generalized inverse matrix to the matrix, and then produces the reproduction signals of the individual tracks from the generalized inverse matrix and a plurality of signals read out by the reproduction head.

21. The reproduction apparatus according to claim 17, wherein said signal separation section calculates a matrix as a channel estimation function using the reproduction signals of the separation patterns and applies a minimum mean squared error method to the matrix to produce the reproduction signals of the individual tracks.

22. A magnetic recording medium having a plurality of tracks, which make one unit for a signal process for data detection, recorded on said medium, a signal of a recording wavelength equal to or greater than a minimum recording wavelength being recorded as separation patterns at unique positions of the individual tracks in order to provide position information of a reproduction head with respect to the plural tracks upon reproduction; and further wherein a synchronizing signal pattern is recorded at a position preceding the separation patterns.

* * * * *